Figure 8:
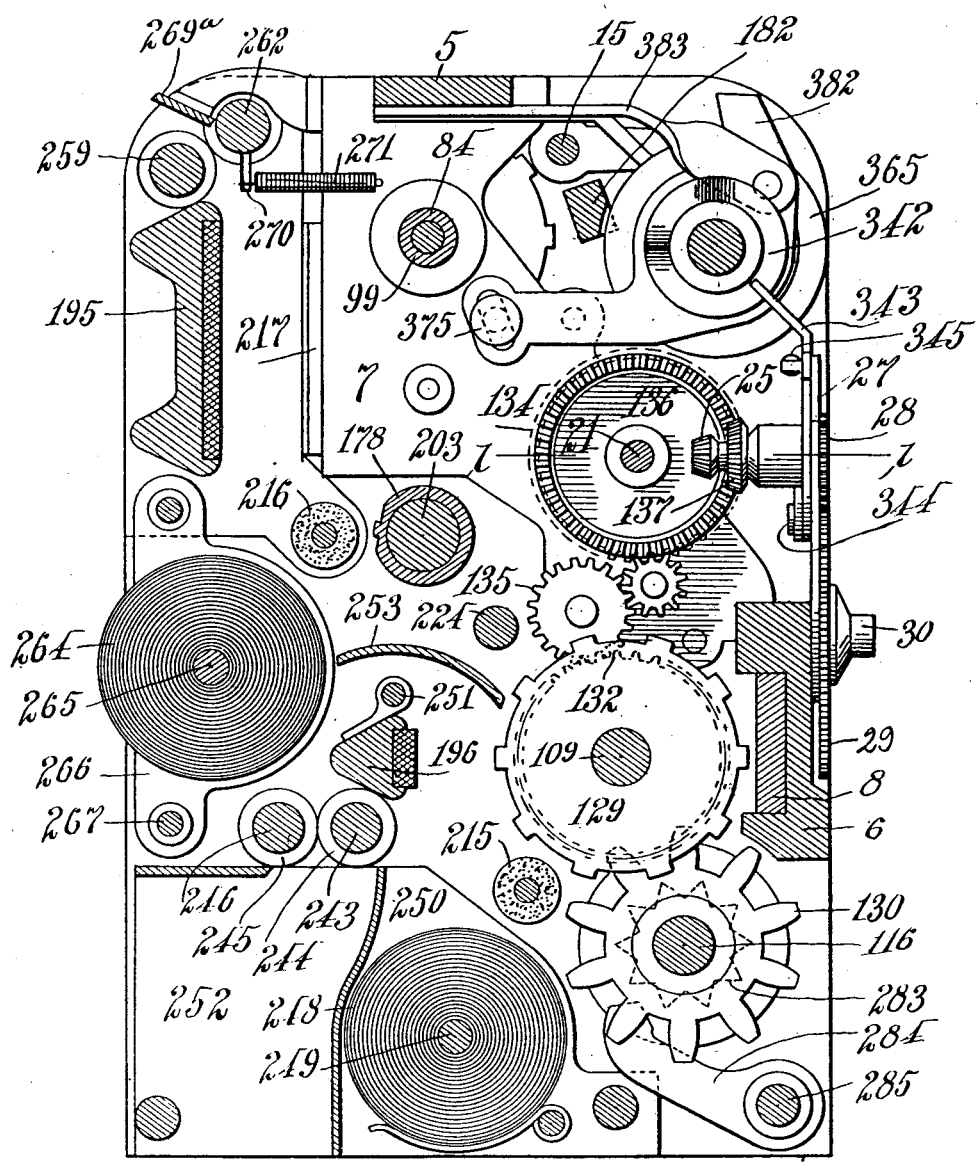

J. F. OHMER & E. H. BRIDENBAUGH.
TAXIMETER.
APPLICATION FILED JUNE 3, 1912.
1,136,164.
Patented Apr. 20, 1915.
21 SHEETS—SHEET 1.
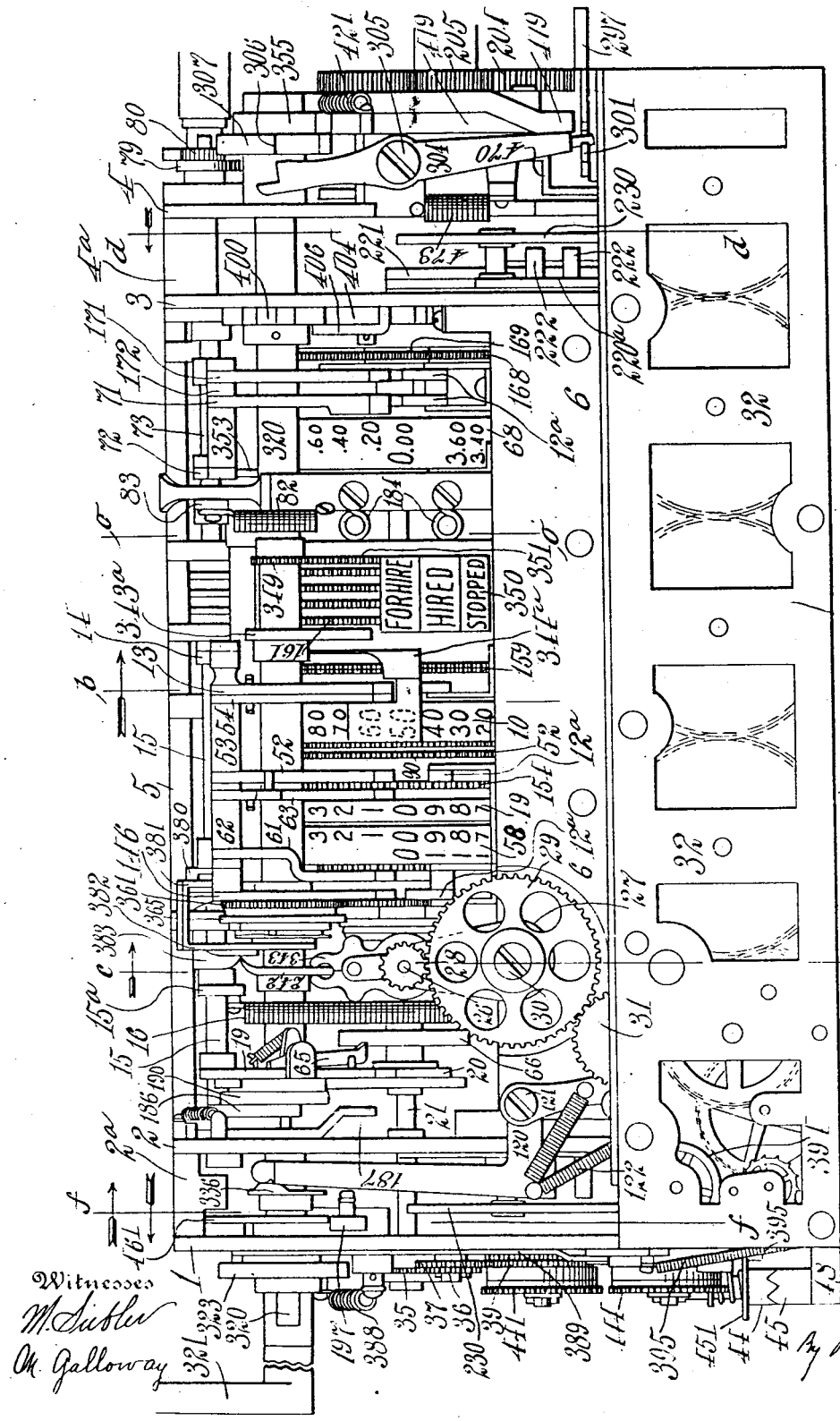

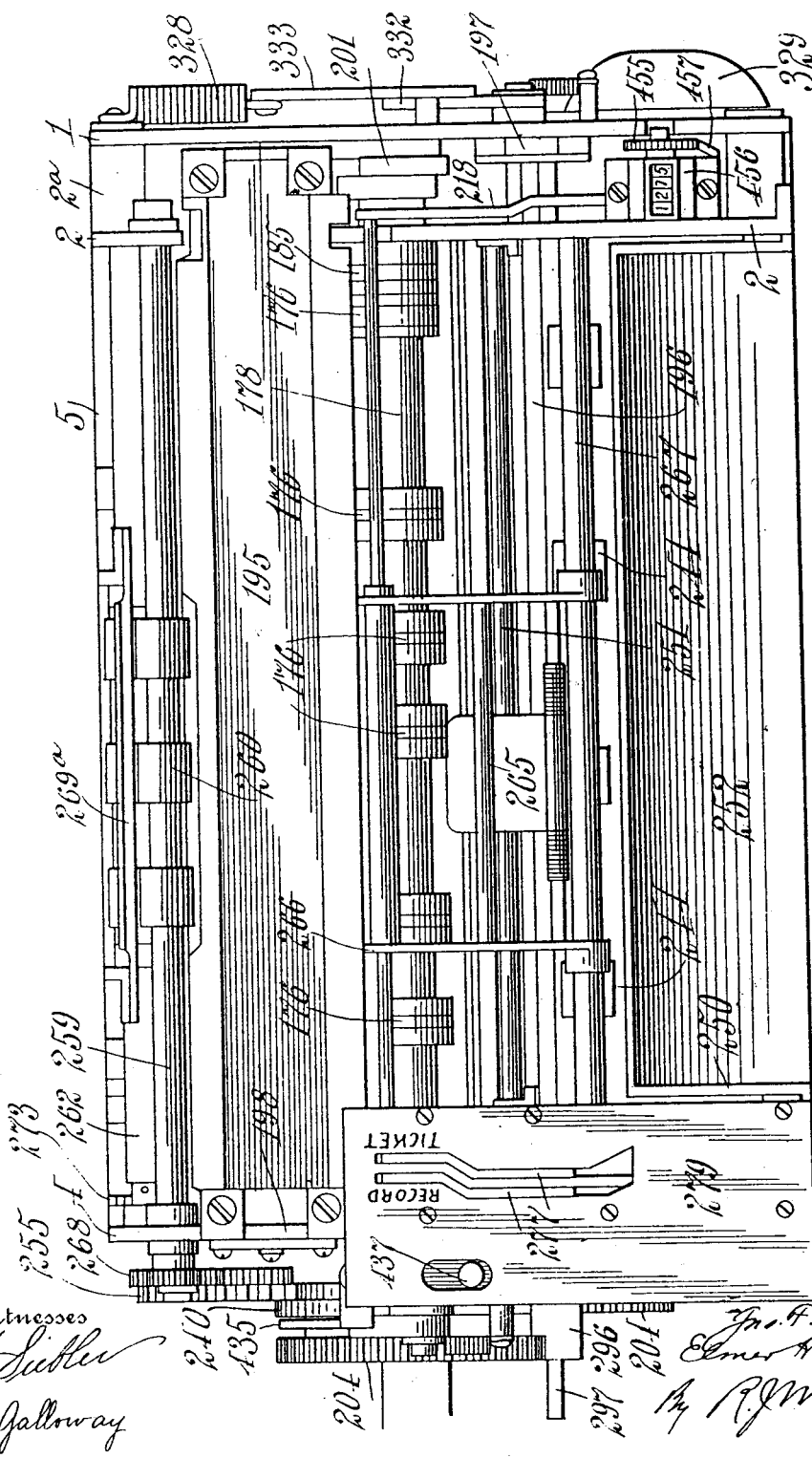

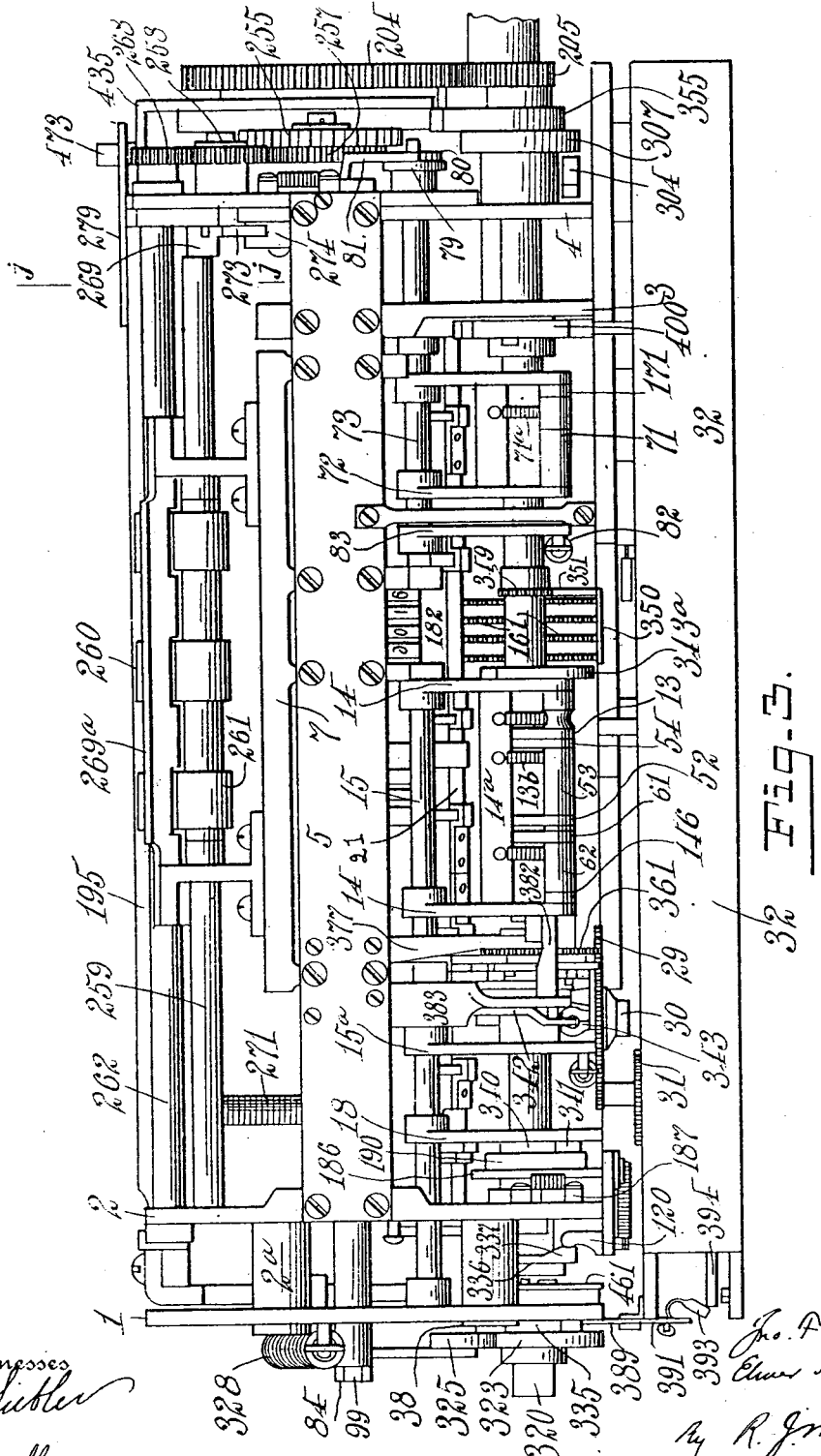

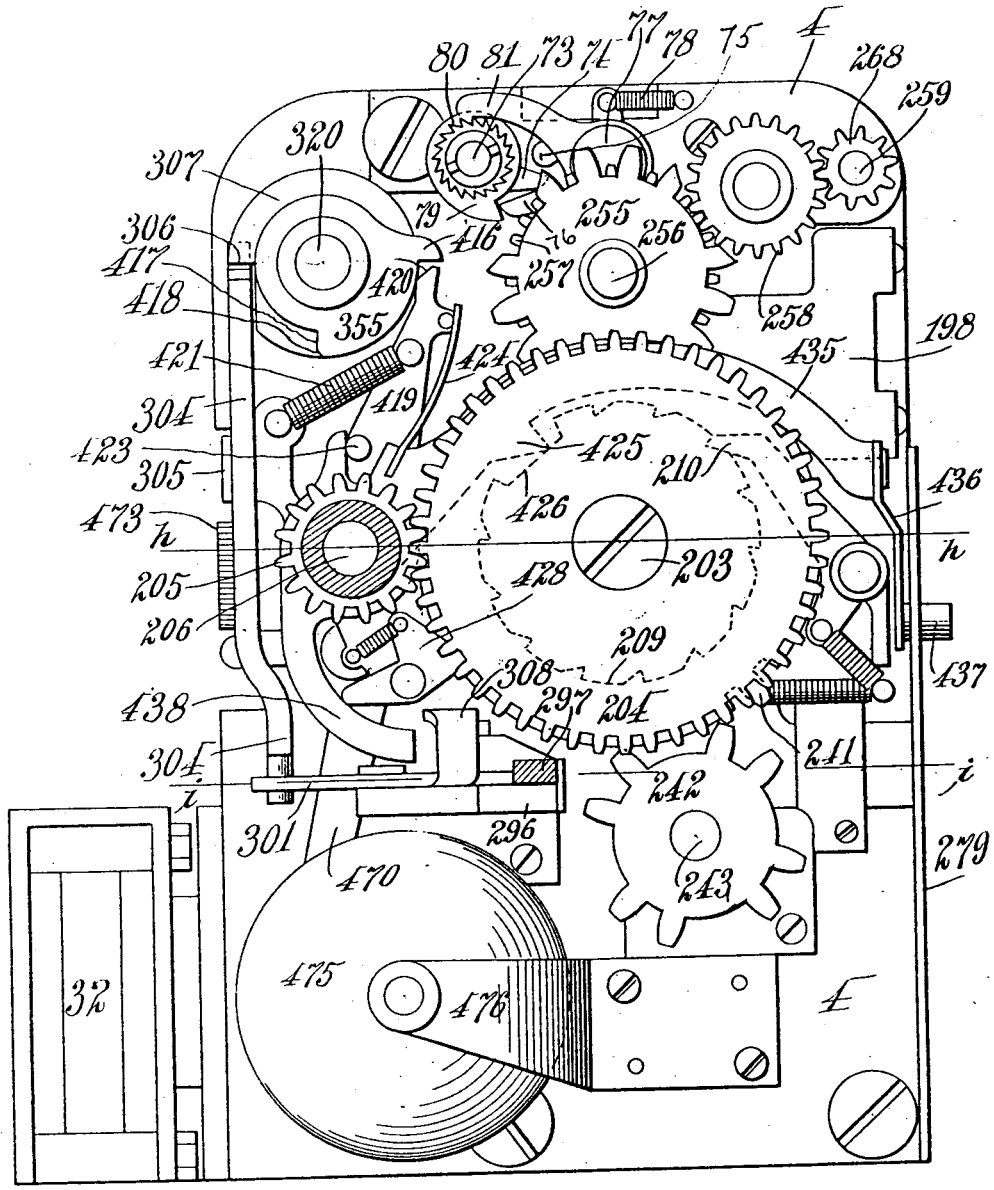

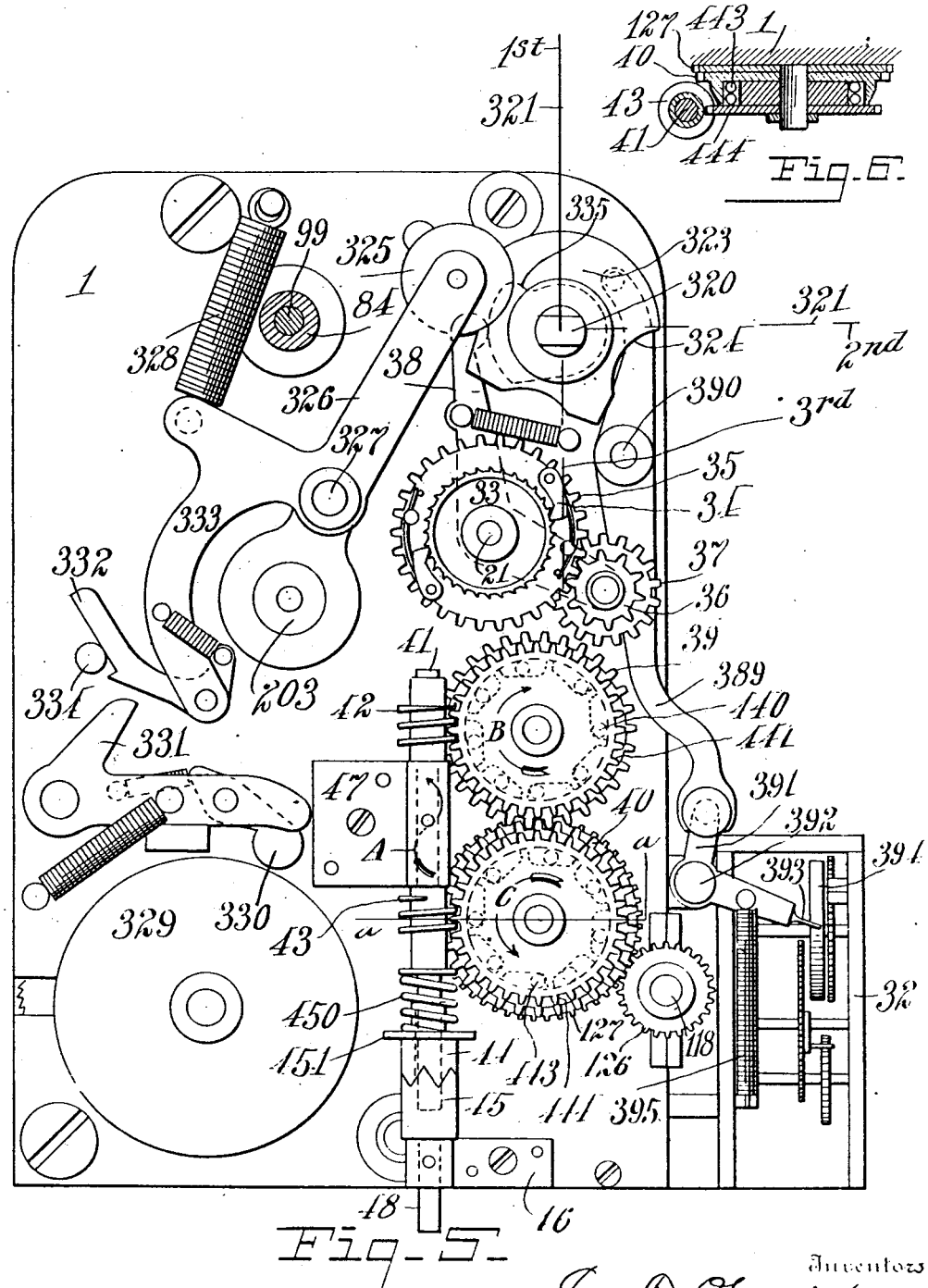

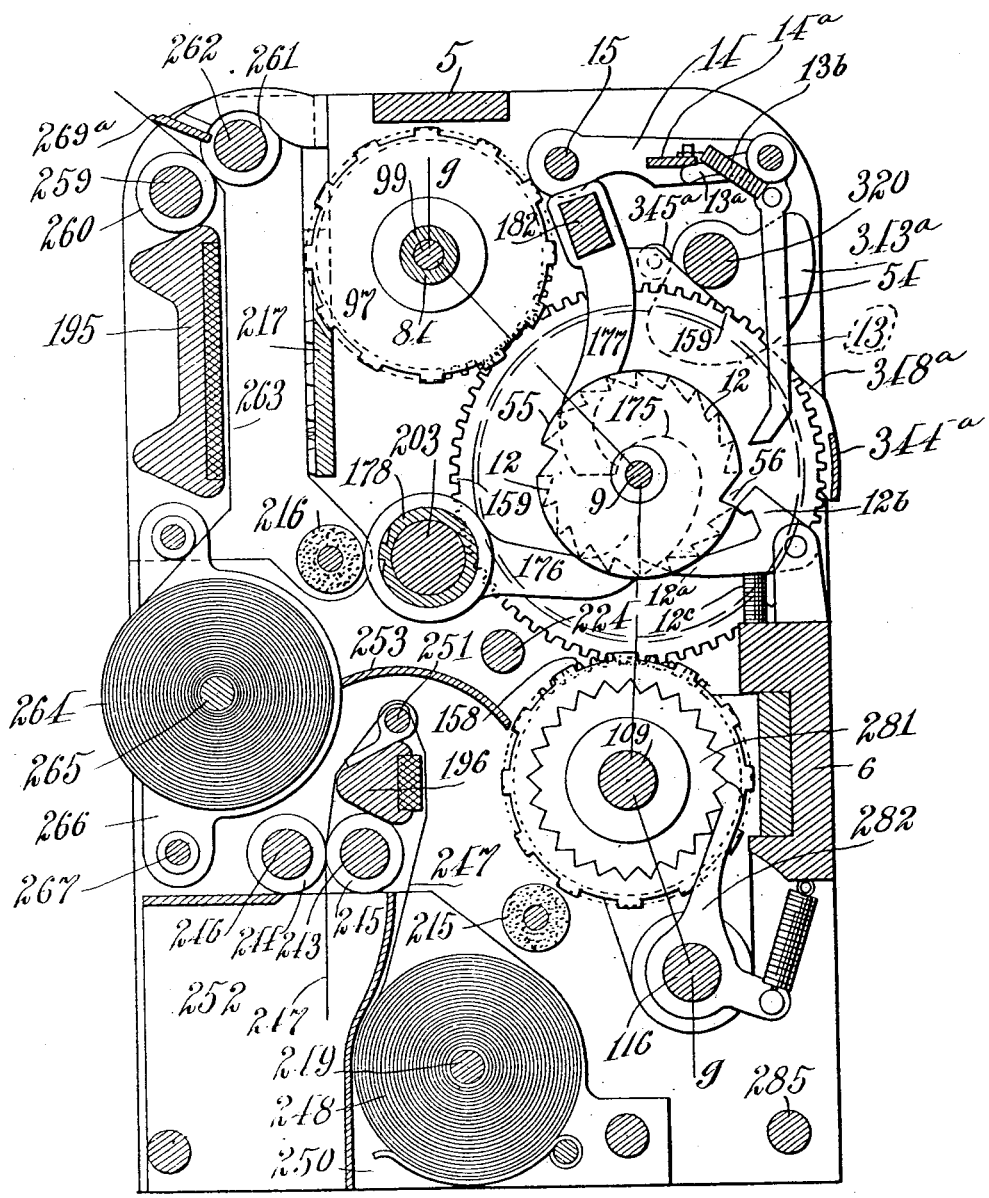
Fig-7-

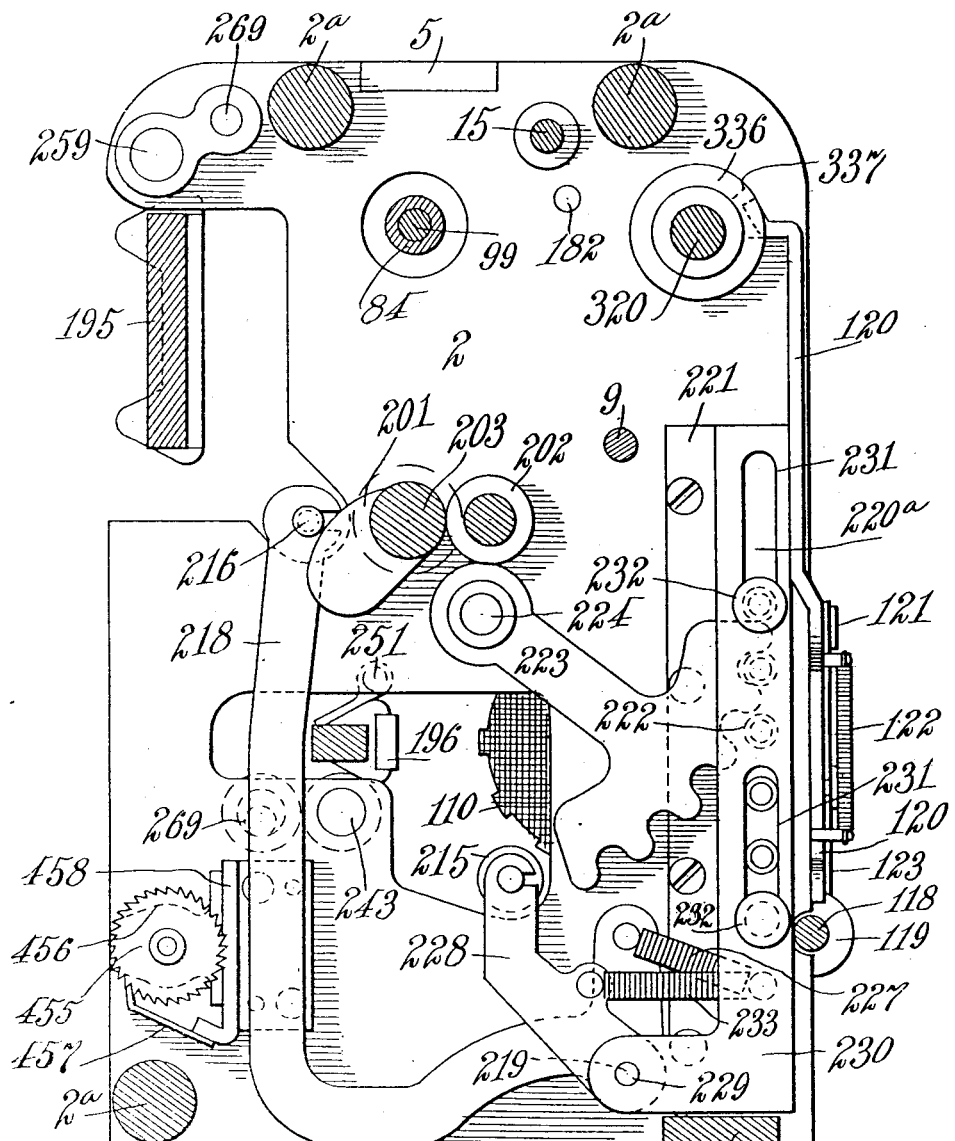

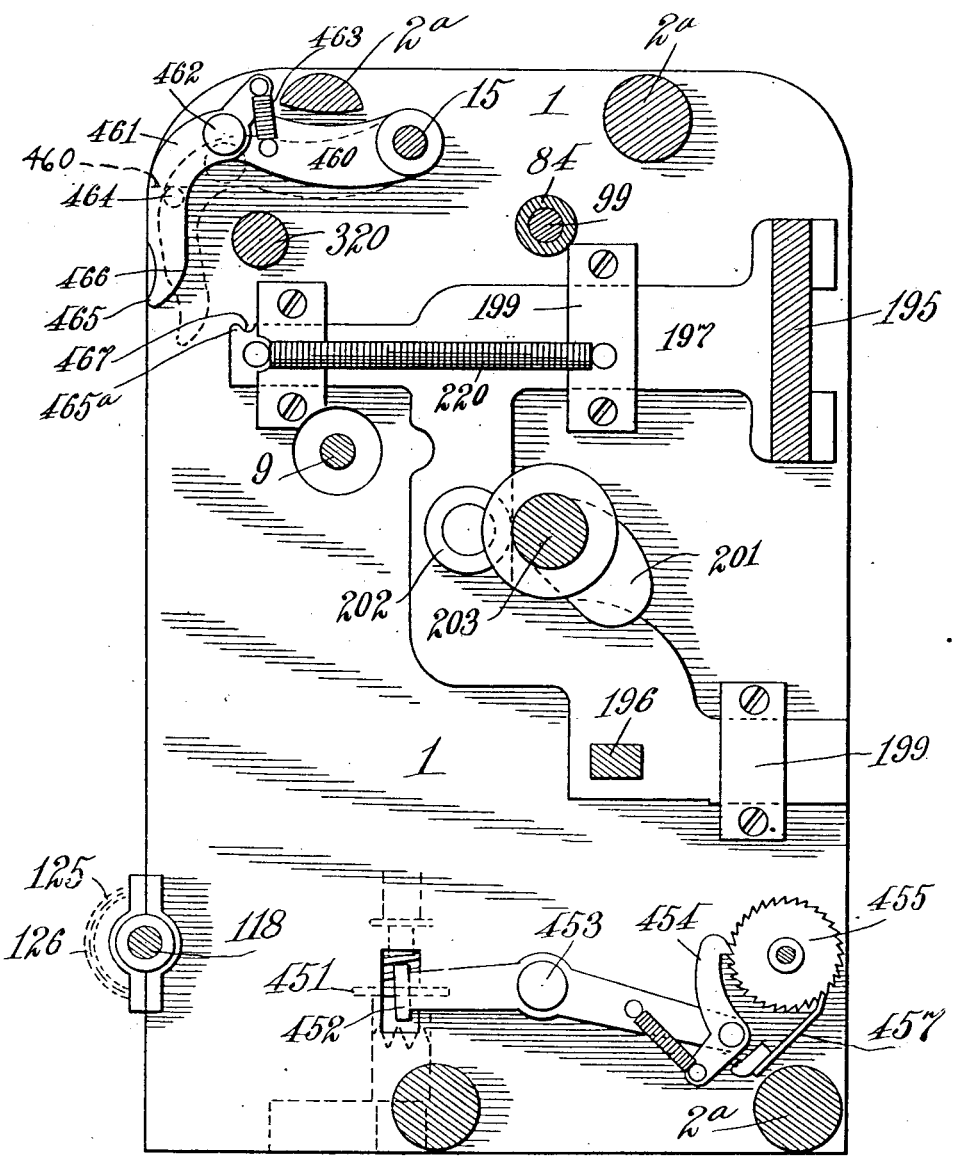

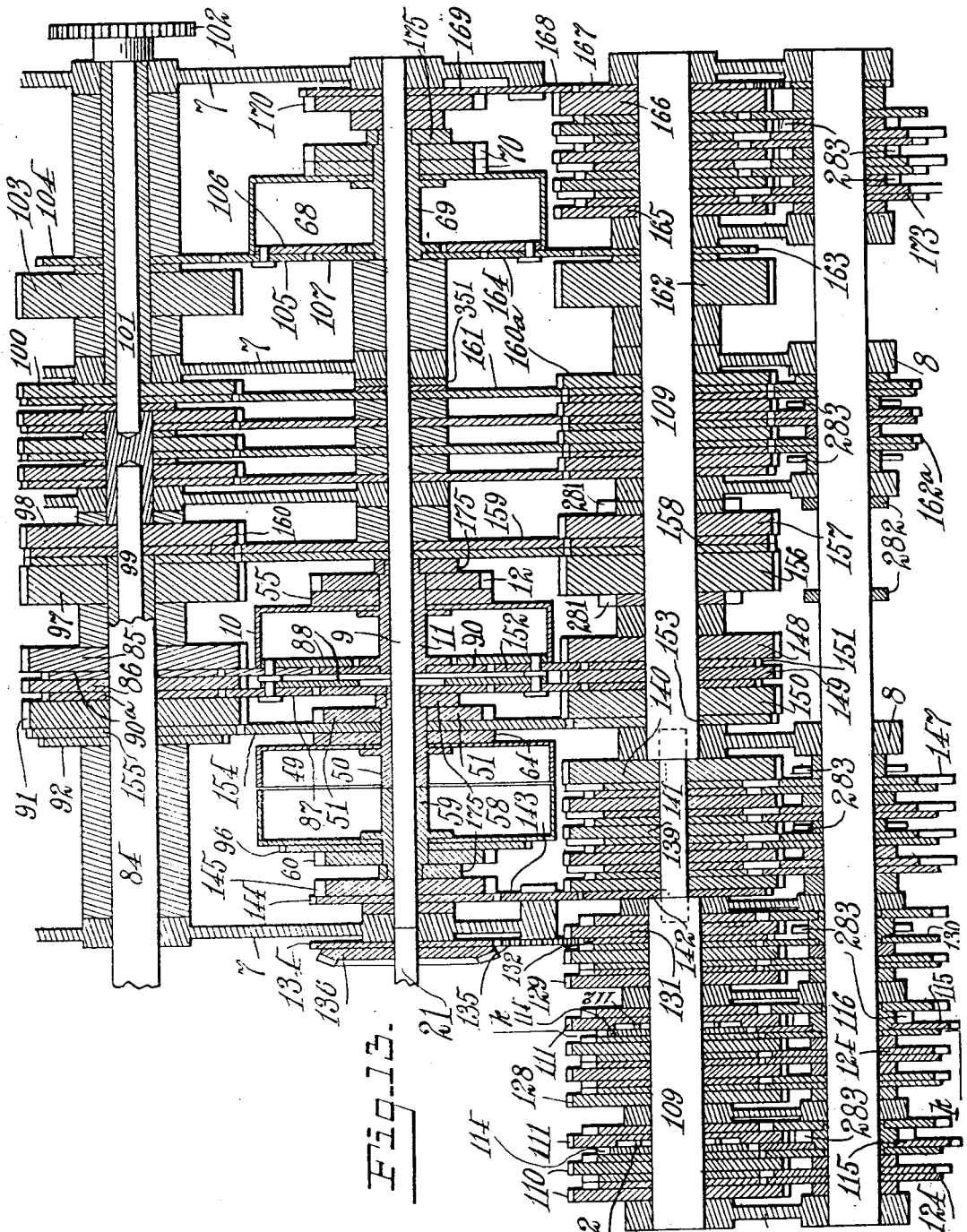

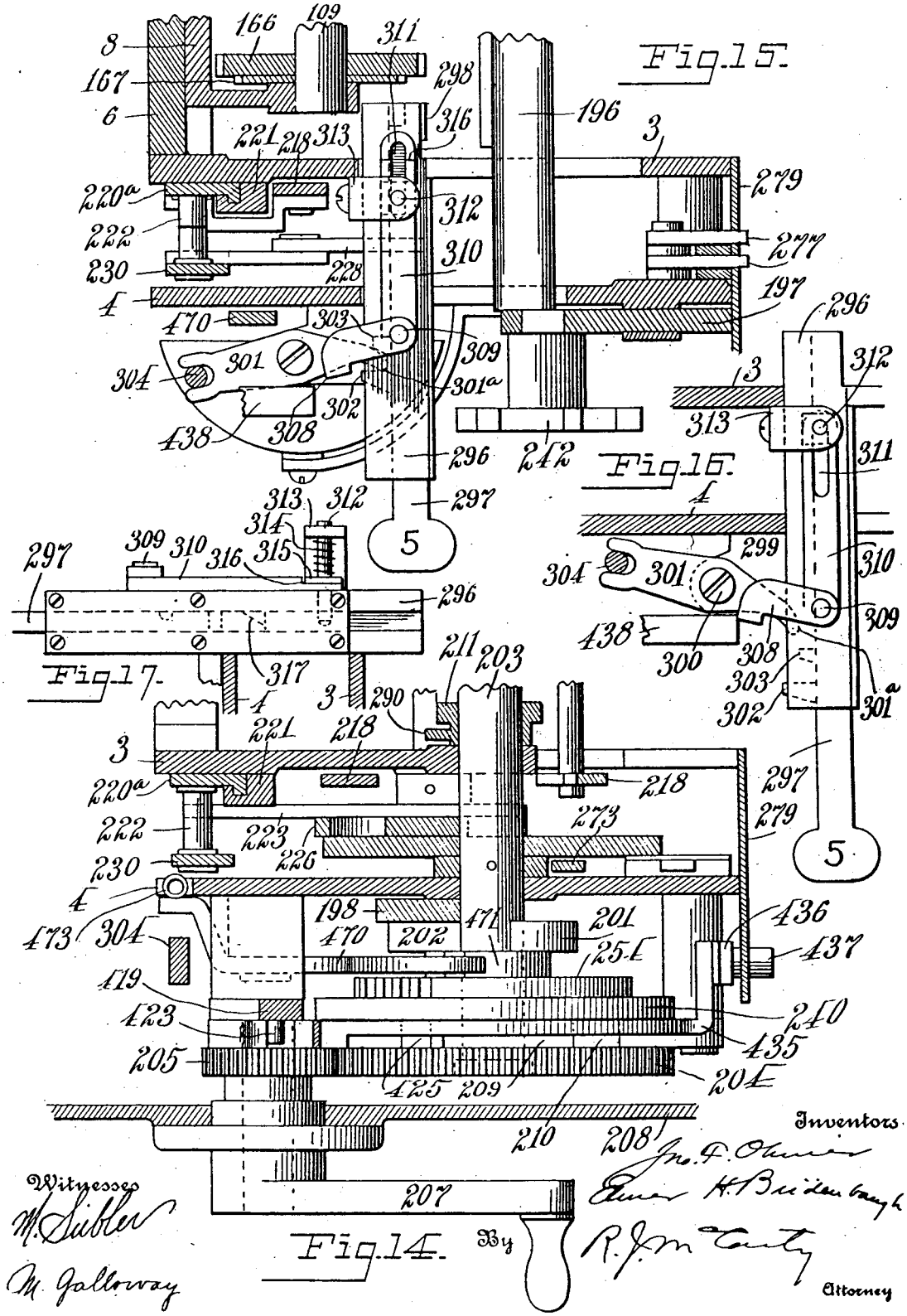

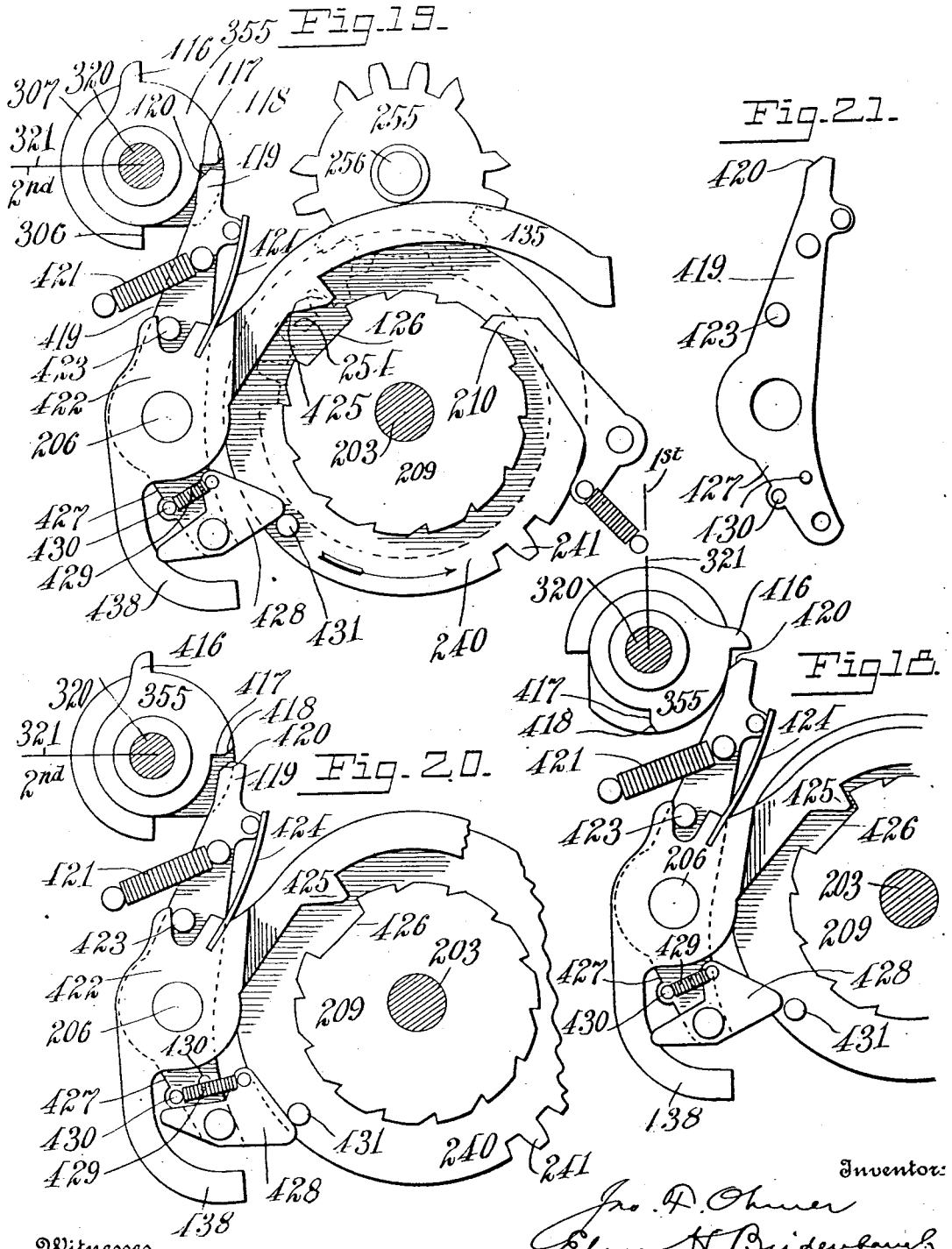

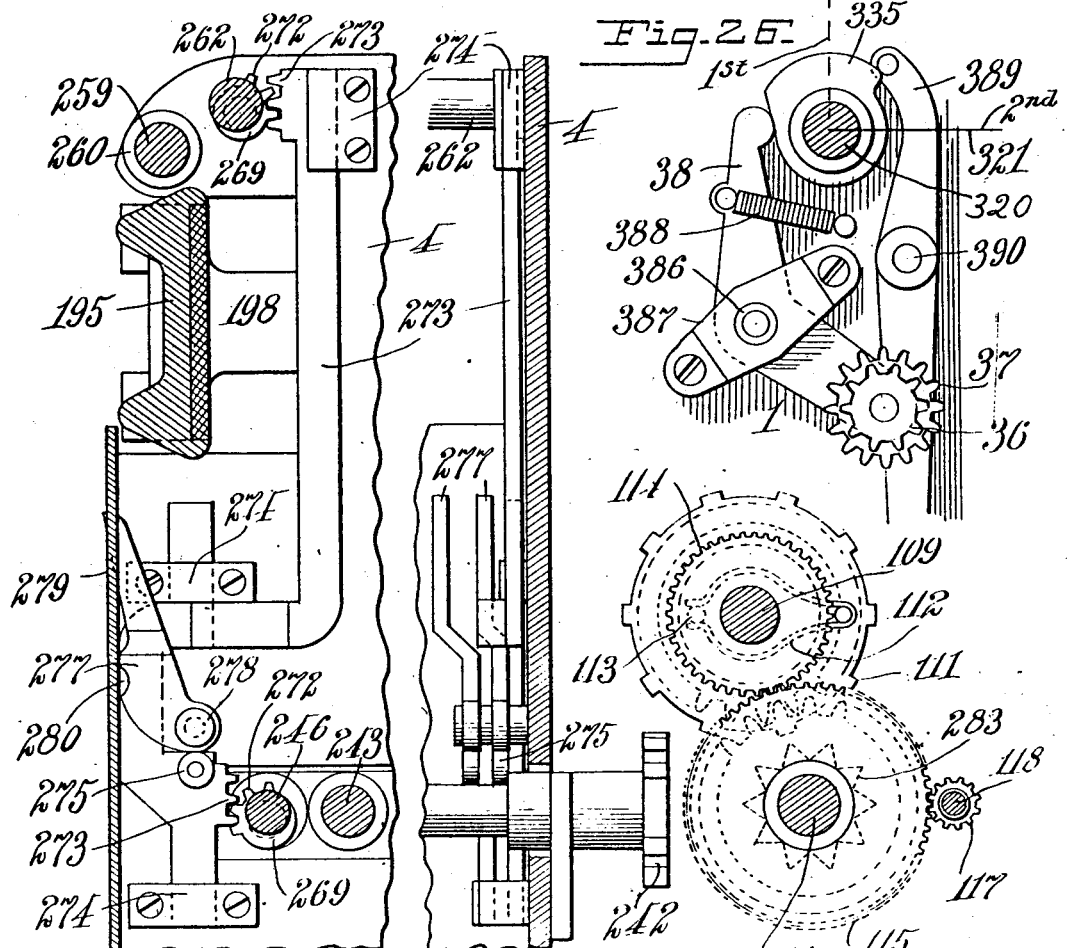
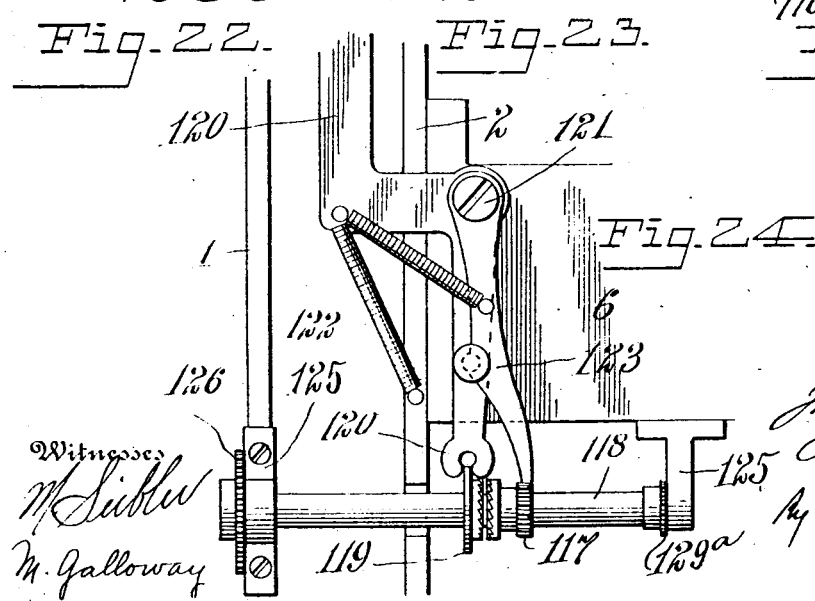

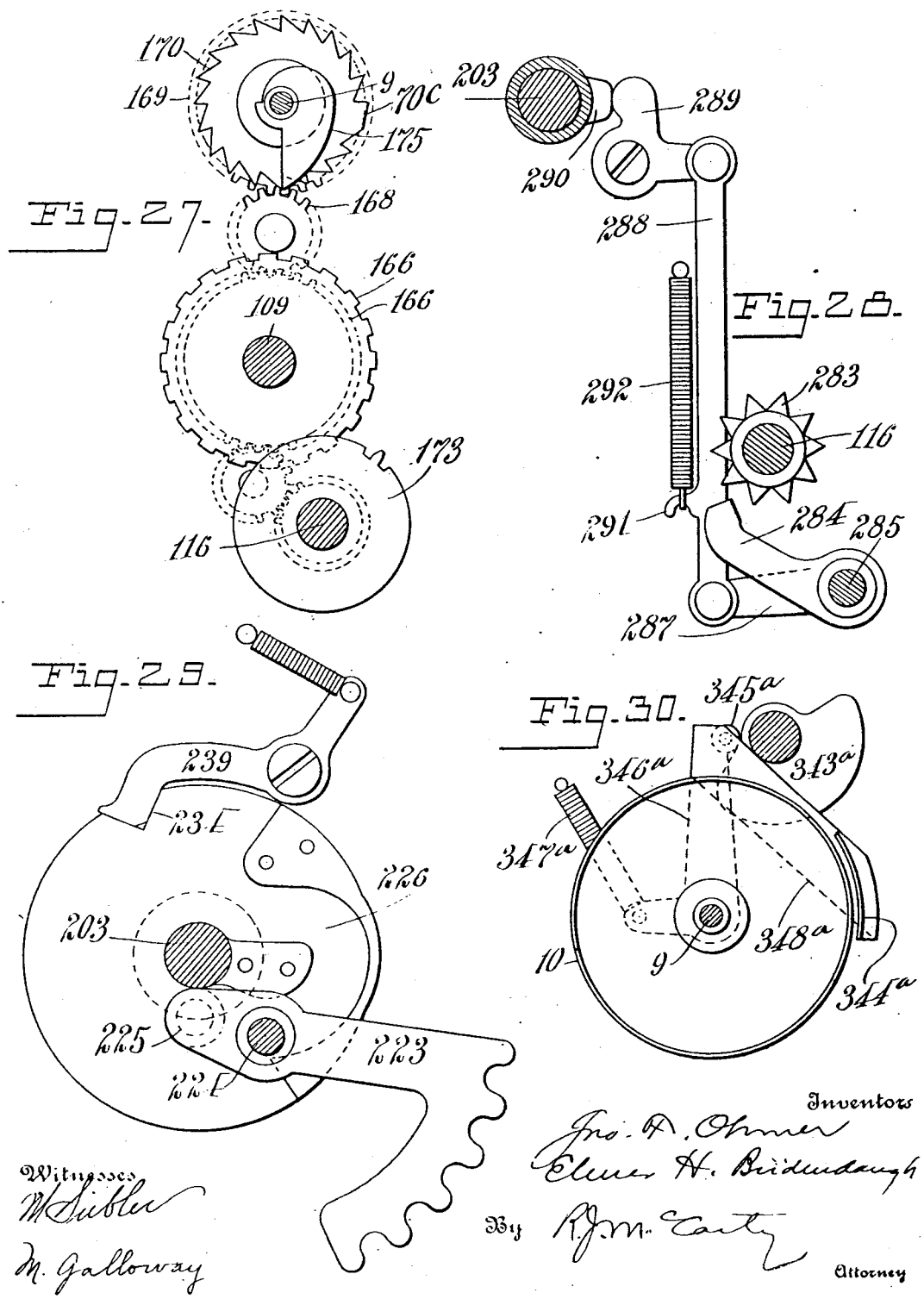

J. F. OHMER & E. H. BRIDENBAUGH.
TAXIMETER.
APPLICATION FILED JUNE 3, 1912.
1,136,164.
Patented Apr. 20, 1915.
21 SHEETS—SHEET 17.
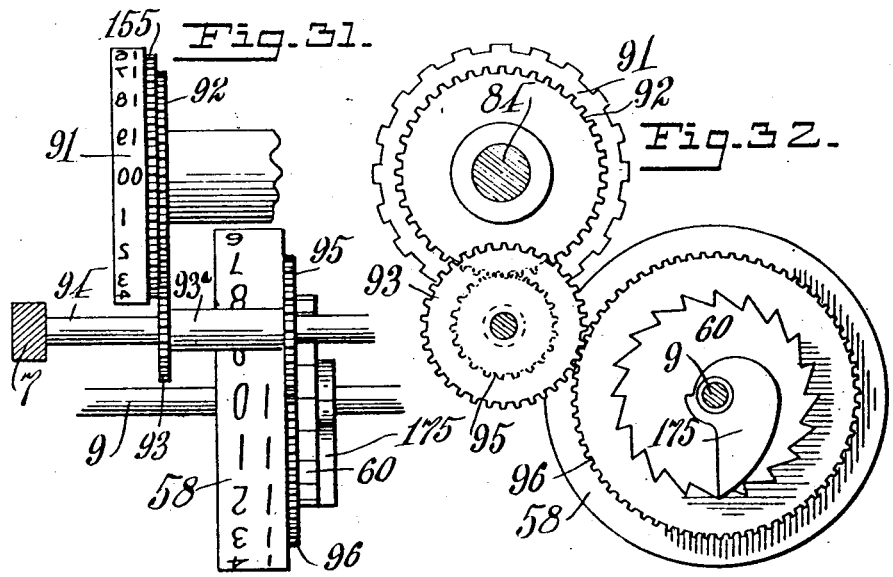
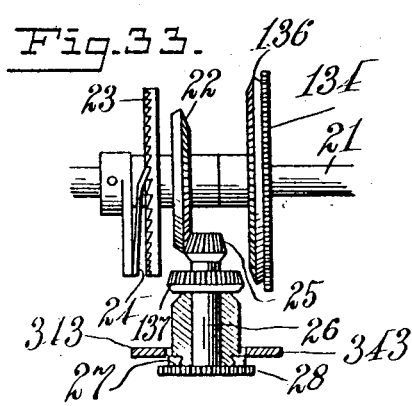
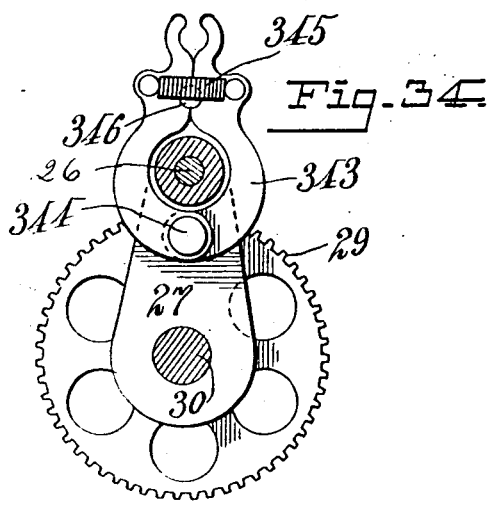
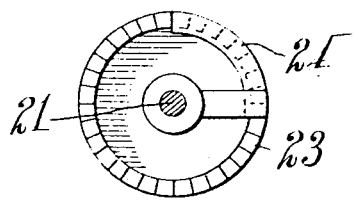
Witnesses
W. Siebler
M. Galloway
Inventors
Jno. F. Ohmer
Elmer H. Bridenbaugh
By R. J. McCarty
Attorney

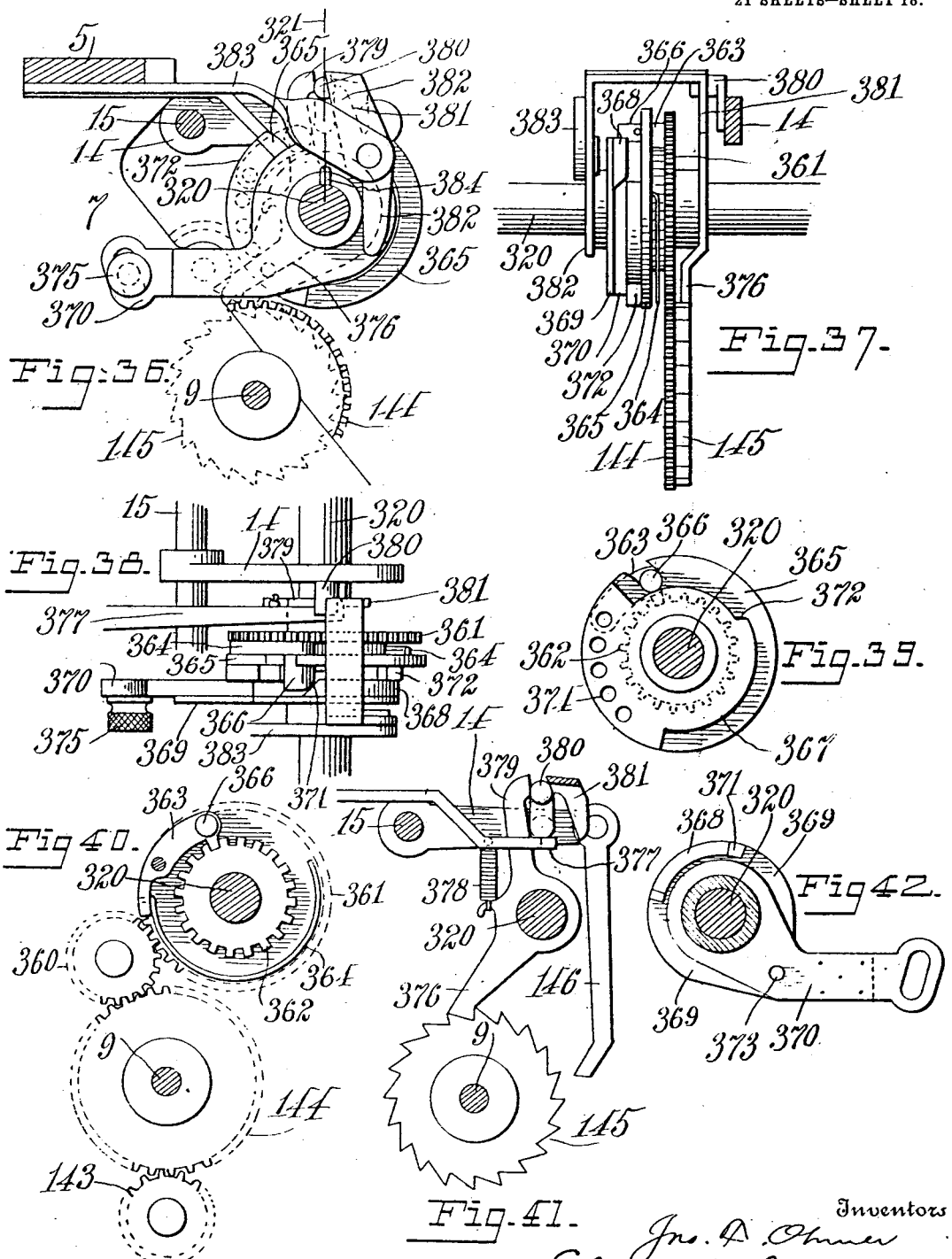

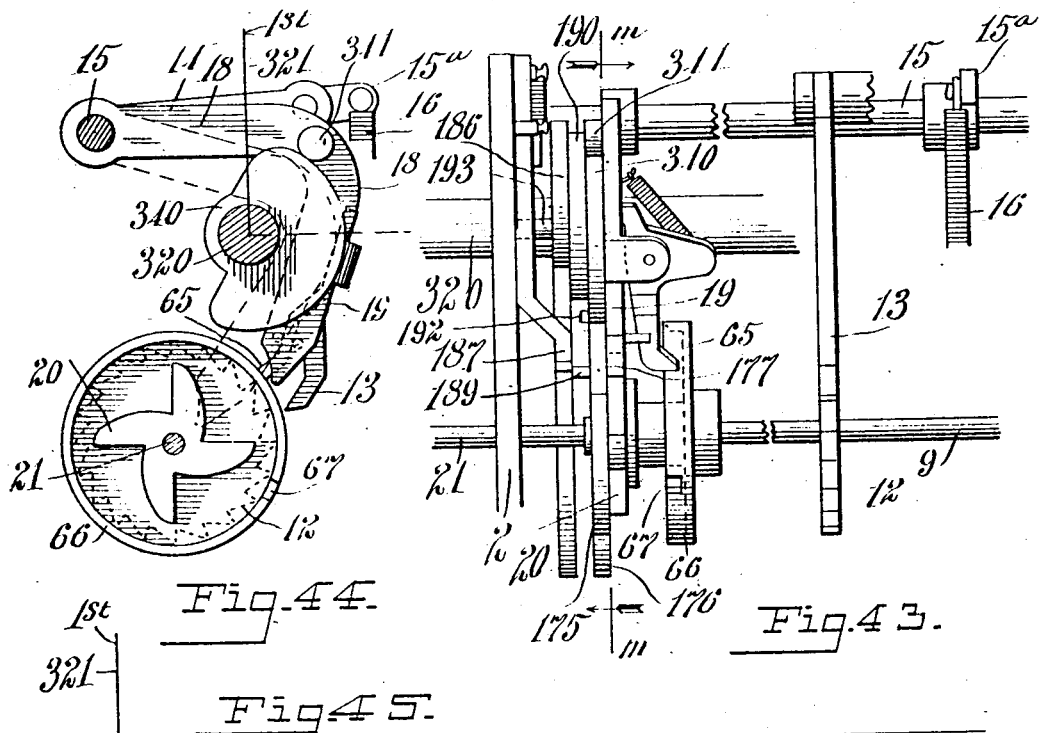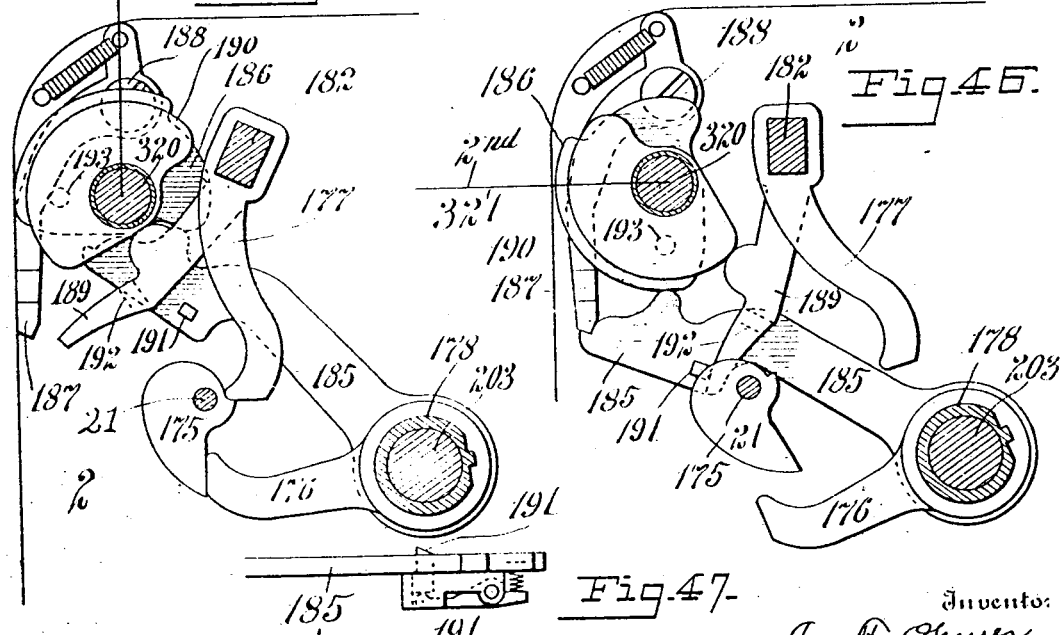

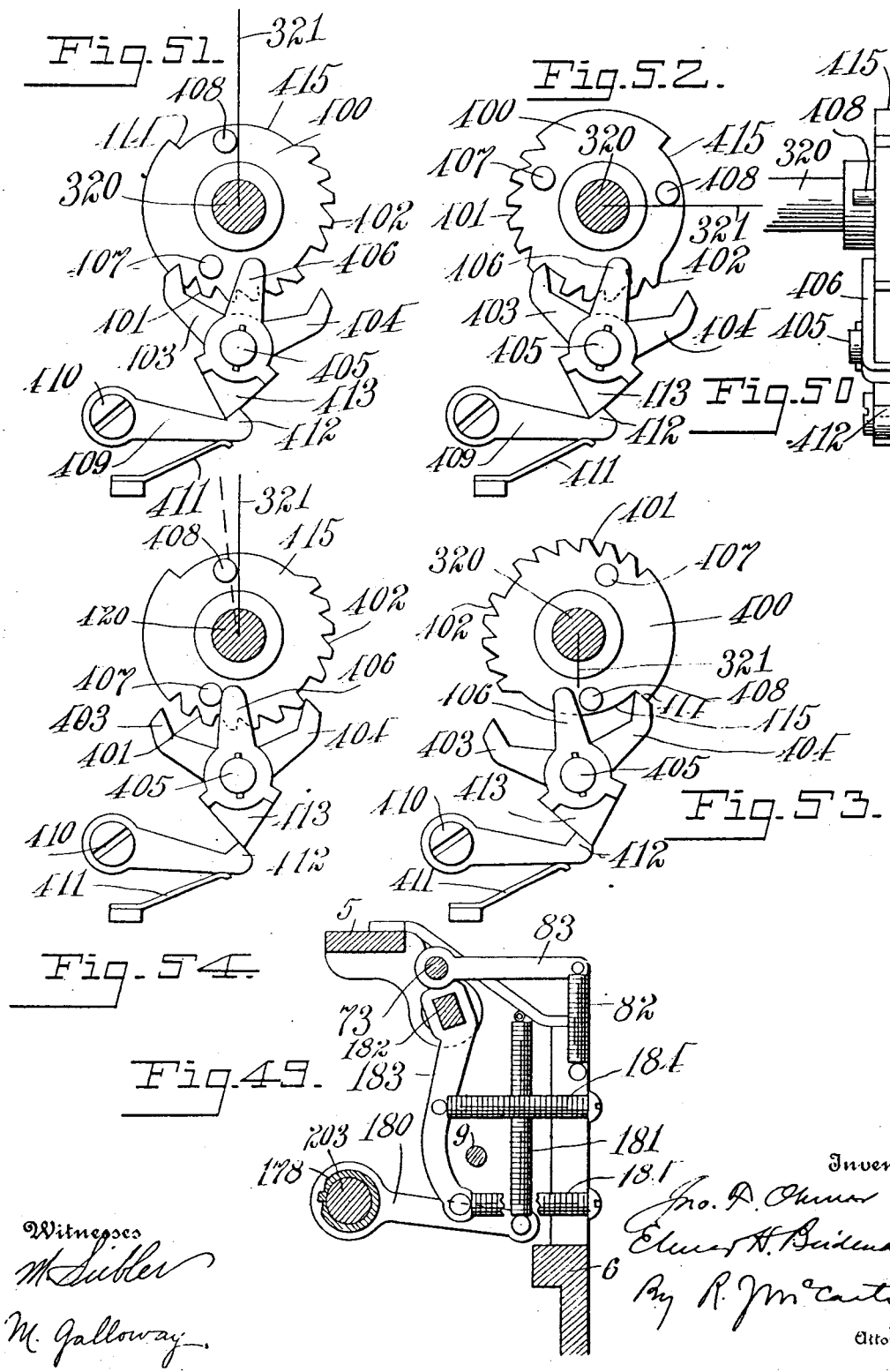

J. F. OHMER & E. H. BRIDENBAUGH.
TAXIMETER.
APPLICATION FILED JUNE 3, 1912.

1,136,164.

Patented Apr. 20, 1915.
21 SHEETS—SHEET 21.

Fig. 55.

Fig. 56.

| TOTAL NUMBER OF CAB TRAVELS. MILES (IN TENTHS) WHEN HIRED | TOTAL NUMBER OF CAB TRAVELS. MILES (IN TENTHS) | NON RECORDING TIME (CAB OUT OF USE) | CASH TOTAL OF FARES. | NUMBER OF MACHINE | FARES IN DETAIL | DATE | SERIAL NUMBER | EXTRA CHARGES IN DETAIL | TOTAL OF EXTRA CHARGES | INDENTIFICATION OF INSPECTOR AND |
|---|---|---|---|---|---|---|---|---|---|---|
| 906-3 | 085-6 | 6 1-5 | 9 4 2 40 | 2 | 0 0.50 | MAY 28 | 3453 | — | 6 1 0 040 | IN527 |
| 927-3 | 113-6 | 6 2-5 | 9 4 3 80 | 2 | 0 1.40 | MAY 28 | 3454 | .80 | 6 1 0 1.20 | 5 |
| 945-3 | 111-6 | 6 3-5 | 9 4 5 00 | 2 | 0 1.20 | MAY 28 | 3455 | — | 6 1 0 1.20 | 5 |
| 947-3 | 132-6 | 6 3-5 | 9 4 5 50 | 2 | 0 0.50 | MAY 28 | 3456 | .20 | 6 1 0 140 | 5 |
| 947-3 | 132-6 | 6 3-5 | 9 4 5 50 | 2 | 0 0.50 | MAY 28 | 3457 | — | 6 1 0 140 | IN527 |

Fig. 67.

| METROPOLITAN TAXICAB COMPANY. DAYTON OHIO U.S.A. | | |
|---|---|---|
| METER NO. 2 | EXTRAS | 20 |
| FARE | | |
| 00.50 | MAY 28 | 3456 |

Witnesses
M. Sibler
M. Galloway

Inventors
Jno. F. Ohmer
Elmer H. Bridenbaugh
By R. J. McCarty
Attorney

UNITED STATES PATENT OFFICE.

JOHN F. OHMER AND ELMER H. BRIDENBAUGH, OF DAYTON, OHIO, ASSIGNORS TO OHMER FARE REGISTER COMPANY, OF DAYTON, OHIO, A CORPORATION OF NEW YORK, (INCORPORATED IN 1902.)

TAXIMETER.

1,136,164.  Specification of Letters Patent.  Patented Apr. 20, 1915.

Application filed June 3, 1912. Serial No. 701,208.

*To all whom it may concern:*

Be it known that we, JOHN F. OHMER and ELMER H. BRIDENBAUGH, citizens of the United States, residing at Dayton, in the county of Montgomery and State of Ohio, have invented certain new and useful Improvements in Taximeters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in taximeters and comprises certain improvements of the taximeter mechanism shown and described in our co-pending applications, Serial Nos. 462,100 and 512,003, filed Nov. 11, 1908, and Aug. 9, 1909, respectively.

The objects of the invention are several, principally, to provide a new form of actuating mechanism for the counting wheels, which is simple and positive in construction and operation: To provide a new and improved form of actuating mechanism for the supplemental counters. To provide new and improved means for resetting all the counting wheels to normal position. To provide an improved printing mechanism. To provide improved inking mechanism for the printing wheels and devices. To provide improved paper feeding mechanism. To provide new and improved means for controlling the machine by means of an identification device. To provide means for adding the initial fare on the total cash fare counter. To provide improved means for controlling the movements of the setting mechanism. To provide improved interlocking mechanism which controls the relation between the setting mechanism and the printing mechanism. To provide means which will drive the machine in a proper direction irrespective of the direction of travel of the vehicle, and, to provide means which indicates and registers when the counters have been obstructed by an improper manipulation of the printing mechanism.

Other objects of the invention will be described in the specification and particularly pointed out in the claims.

Figure 9:
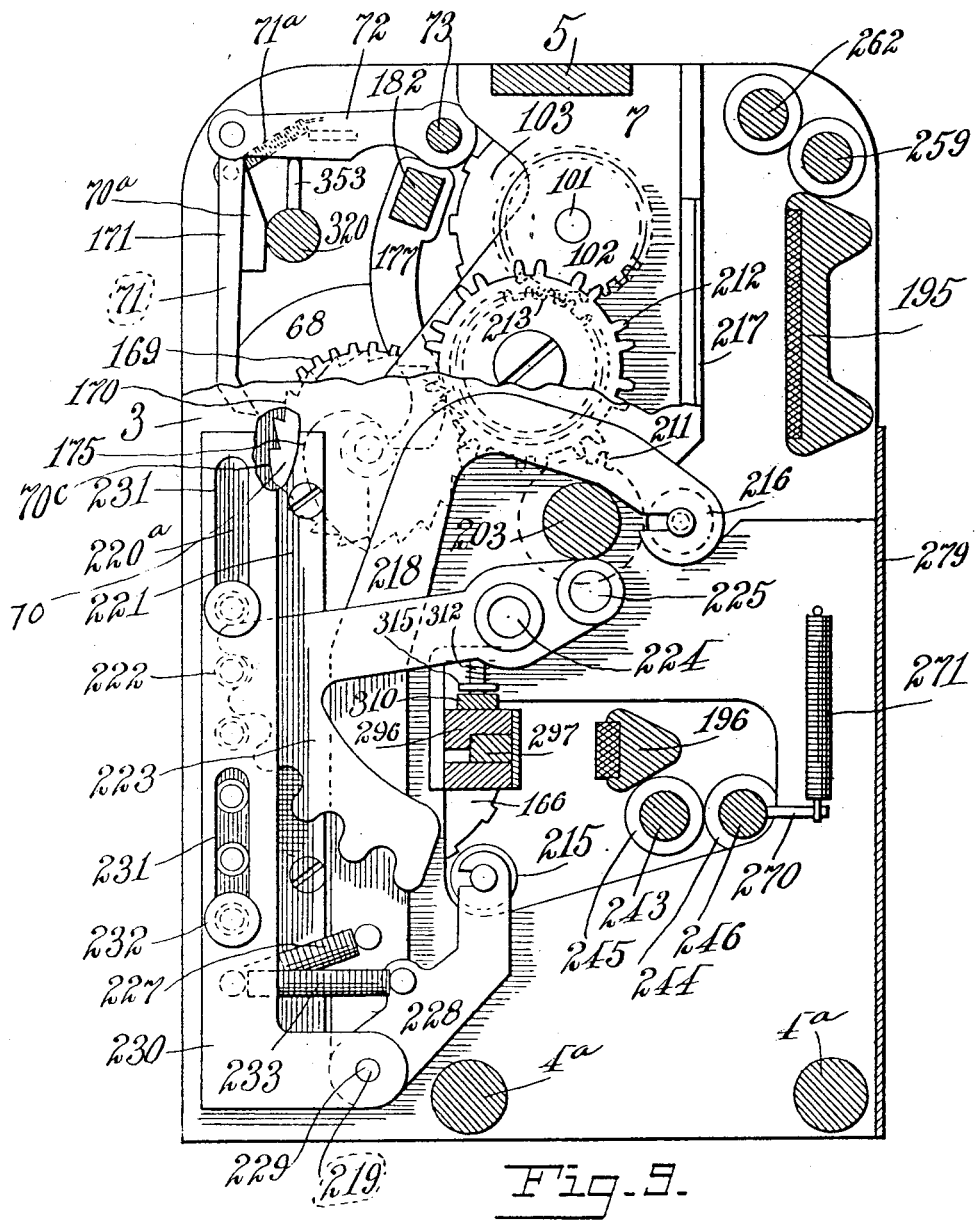
Figure 10:
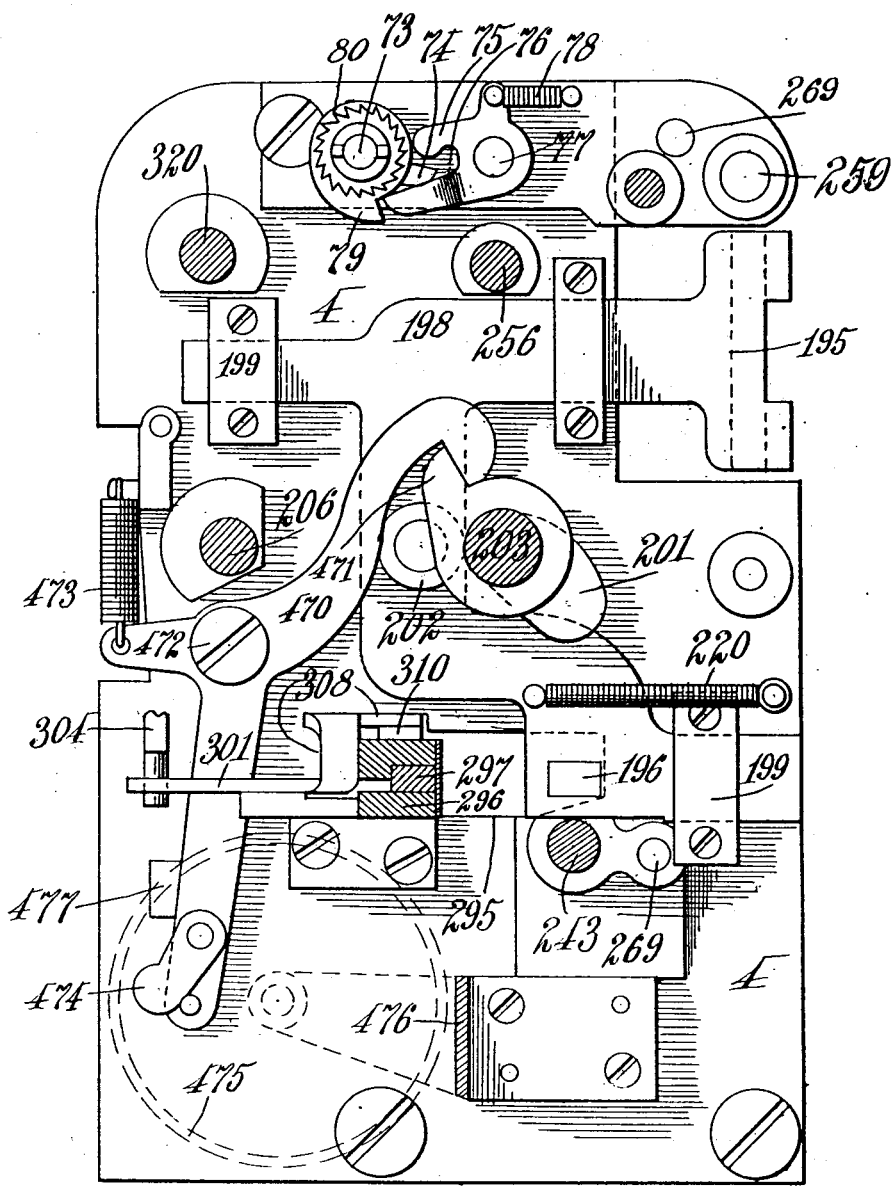

Referring to the accompanying drawings, Figure 1 is a front elevation of the machine with the casing removed; Fig. 2 is a rear elevation of the machine; Fig. 3 is a top plan view thereof; Fig. 4 is an elevation of the right end of the machine viewing the same as shown in Fig. 1; Fig. 5 is an elevation of the left end of the machine; Fig. 6 is a detail in section on the line $a$—$a$ of Fig. 5; Fig. 7 is a section on the line $b$—$b$ of Fig. 1 with the clock mechanism removed; Fig. 8 is a section on the line $c$—$c$ of Fig. 1; Fig. 9 is a section approximately on the line $d$—$d$ of Fig. 1 with parts broken away; Fig. 10, Sheet 9, is a view of the right end of the machine with various parts removed; Fig. 11, Sheet 10, is a section on the line $f$—$f$ of Fig. 1 looking in the direction of the uppermost arrow, as seen in said Fig. 1; Fig. 12, Sheet 11, is a section on the line $f$—$f$ of Fig. 1 looking in the direction of the lowermost arrow, as seen in Fig. 1; Fig. 13, Sheet 12, is a section on the line $g$—$g$ of Fig. 7, Sheet 6; Fig. 14, Sheet 13, is a section on the line $h$—$h$ of Fig. 4, Sheet 4; Fig. 15, Sheet 13, is a section on the line $i$—$i$ of Fig. 4, Sheet 4; Fig. 16, Sheet 13, is a top plan view of the pocket for the identification device or key; Fig. 17, Sheet 13, is a side elevation of the same; Fig. 18, Sheet 14, is a detail view of the interlocking levers which control the setting and printing mechanisms, the same being shown in their normal position; Fig. 19, Sheet 14, is a similar view of the same after the setting mechanism has been actuated; Fig. 20, Sheet 14, is a similar view of the same after the printing mechanism has been actuated; Fig. 21, Sheet 14, is a detail view of one of the interlocking levers; Fig. 22, Sheet 15, is a view of the feed-roll-separating mechanism on the line $j$—$j$ of Fig. 3; Fig. 23, Sheet 15, is a side elevation of the same with the adjacent parts; Fig. 24, Sheet 15, is a detail view of the driving mechanism for the mileage counters; Fig. 25, Sheet 15, is a detail view of the flexible driving connections for the mileage counters, the same being a section on the line $k$—$k$ of Fig. 13, Sheet 12; Fig. 26, Sheet 15, is a detail view of the disengaging means for the counter actuating means driven from the wheels of the vehicle on which the taximeter is placed; Fig. 27, Sheet 16, is a detail view of the connecting gears between the total counter for the extra charges and its actuator; Fig. 28, Sheet 16, is a detail view of the actuating mechanism for the alining pawls for the ticket printing wheels; Fig. 29, Sheet 16, is a detail view of the printing roll actuating mechanism; Fig. 30, Sheet 16, is a detail view of the blind for the initial wheel of the fare indicator; Fig. 31, Sheet 17, is a rear elevation of the connecting gears between the indicating tens and hundreds of dollars' wheel and it corresponding printing wheel for the ticket; Fig. 32, Sheet 17, is a side elevation of the same; Fig. 33, Sheet 17, is a section on the line l—l of Fig. 8, Sheet 7.; Fig. 34, Sheet 17, is a rear view of the lever which controls the operation of the fare indicating wheels and nonrecording time wheels, from the clock; Fig. 35, Sheet 17, is a detail view of the ratchet through which the fare indicating wheels are driven from the clock; Fig. 36, Sheet 18, is a side elevation of the mechanism which adds the initial fare on the total cash fare counter; Fig. 37, Sheet 18, is a front elevation of the same; Fig. 38, Sheet 18, is a top plan view of the same; Fig. 39, Sheet 18, is a detail view of the throw-out cam for the initial fare adding mechanism; Fig. 40, Sheet 18, is a detail view of the connecting gears between the initial fare-adding mechanism and the total counter; Fig. 41, Sheet 18, is a detail view of the retaining or locking pawl for the total cash counter for the fares; Fig. 42, Sheet 18, is a detail view of the spring guide and its supporting means for the actuating pawl for the initial fare adding mechanism; Fig. 43, Sheet 19, is a front elevation of the indicating counter actuating mechanism and the mechanism which resets the indicating wheels to a normal position; Fig. 44, Sheet 19, is a side elevation of the actuating mechanism for the indicating wheels, the same being a section on the line m—m of Fig. 43, looking in the direction of the upper arrow; Fig. 45, Sheet 19, is a detail view of the indicating wheel resetting mechanism, the same being on the line m—m of Fig. 43, looking in the direction of the lower arrow; Fig. 46, Sheet 19, is a similar view to Fig. 45, with the parts in a different position; Figs. 47, and 48, Sheet 19, a top plan view and a side elevation, respectively, of the pawl mounted on the lever, which controls the shaft which initially resets the indicating wheels, and which controls the shaft which completes the resetting of the fare indicating wheels; Fig. 49, Sheet 20, is a detail view of the springs which control the resetting shafts, the same being a section on the line o—o of Fig. 1; Fig. 50, Sheet 20, is a front elevation of the mechanism which controls the movement of the setting mechanism; Fig. 51, Sheet 20, is a side elevation of the same in a normal position; Figs. 52, 53 and 54, Sheet 20, are similar views of the same in other positions; Fig. 55, Sheet 20, is a perspective view of the identification key or device; Fig. 56, Sheet 20, is a view of a printed record, as taken from the machine; Fig. 57 is a view of a ticket or receipt as issued.

In a detail description of the invention, the same reference characters are used to indicate similar parts as described and illustrated.

The mechanism of the machine is mounted in suitable frame work, consisting of an outer plate 1, connected with an inner plate 2 by bosses 2ª and an inner plate 3 which is connected with an outer plate 4 by bosses 4ª. The inner plates 2 and 3 are connected by an upper longitudinal member 5, and a lower member 6 which extends across the front of the machine near the bottom thereof. The upper longitudinal member 5 supports a frame 7 which in turn supports the fare indicating wheels and the type wheels that print the ticket or receipt. The member 6 supports a frame 8 which in turn supports the type wheels that print the record. The frame-work as thus constructed is mounted on a suitable base and is housed by a casing, which parts are not shown. It will, of course, be understood that the frame work may be varied as may also other parts of the machine without affecting the essentials of the invention.

In order that the invention and the various mechanisms thereof may be completely understood, a description of the same will be arranged under separate and distinct headings:

*Indicating wheels and their actuating mechanism.* — This mechanism is more clearly seen in Figs. 1, 5, 7, 13, 43 and 44. Journaled on the frame 7 is a stationary shaft 9 upon which is mounted a unit and ten cents fare-indicating wheel 10. The periphery of the wheel 10 is provided with twenty indicating characters which are duplicated and which progress in numerical value by ten units or ten cents. The normal position of said wheel is such that one of its indications, for example, "50" is opposite a sight opening in the casing. The said indication "50" represents the initial charge that each passenger is required to pay when hiring the vehicle or cab. The fare charges in addition to said amount are indicated by the wheel 10 during its subsequent rotation, either according to the distance traveled or the time consumed. The said wheel 10 is rotated intermittently as follows. Secured to the hub 11 of said wheel is a twenty tooth ratchet 12 adapted to be engaged by a pawl 13 mounted on a frame 14. When the machine is in a normal or unhired position, the frame 14 is held, by the setting mechanism hereinafter described, in an extreme upper position with the pawl 13 held out of engagement with the ratchet 12 by a projection 13ª engaging a cross member 14ª on the frame 14. When the frame 14 is depressed, the pawl 13 on said frame is placed in engagement with the ratchet 12 by a spring 13ᵇ. The ratchet 12 is provided with a retaining pawl 12ª, controlled by a spring 12ᶜ, and pivoted to the member 6 and which prevents retrograde movement of the ratchet, see Fig. 7, Sheet 6. The pawl 12ª is provided with a projection 12ᵇ adapted to engage the hanging pawl 13 when said pawl 13 is in its lowermost position. When this engagement takes place, the projection 12ᵇ will jam the pawl 13 into the teeth of the ratchet 12 thereby preventing overthrowing of the ratchet. The frame 14 is rigidly attached to a rock shaft 15 journaled in the frame 7. The shaft 15 is provided with an arm 15ª to which is secured a spring 16 and which is adapted to depress the pawl 13 after said pawl has been elevated to an intermediate or counter actuating position. The pawl 13 is elevated to be depressed by the spring 16 to actuate the wheel 10 by the following device, see particularly Figs. 1 and 3. Rigidly secured to said shaft 15 is an arm 18 provided with a projection 19 having a spring controlled pawl 65 pivoted thereto. When the cab is hired, the pawl 65 is initially in engagement with a drum 66 secured to a shaft 21 and having a recess 67 in the flange thereof. The shaft 21 is in alinement with the shaft 9, and the abutting ends thereof find bearing in the frame 7, see Fig. 13. When in a normal position, the recess 67 is so situated in relation to the pawl 65, that the shaft 21, journaled in the frame 7 and plate 1, will be rotated, either by the clock or the axle of the vehicle as is hereinafter described, a sufficient extent to give the passenger the service of the cab to the extent of 60¢, before the pawl 65 drops through the recess 67 and the pawl 13 is depressed by the spring 16. The fee, to-wit, 60¢ represents the indication which will be exposed when the pawl 65 reaches the recess 67 and the frame 14 is actuated. When the pawl 65 passes through the recess 67, the projection 19 of the arm 18 will engage a four leaf cam 20 on the shaft 21. During the continued rotation of the shaft 21, the projection 19 will ride up on the leaves of the cam, thereby elevating the pawl 13, and when said projection drops off said cam, the spring 16 will depress the pawl 13 and thereby rotate the wheel 10 one indication, thereby adding ten to the fare previously indicated. The cam 20 is rotated at such a speed that said cam makes one-fourth of a revolution whenever the cab has been hired to the extent of ten cents, reckoning the charges either by the time consumed or by the distance traveled. It is contemplated that the fare will be charged according to the time consumed when the cab is at a standstill, or is running under a certain speed, in which case the cam 20 is rotated by clock mechanism as follows.

Freely mounted on the shaft 21 is a bevel-gear 22 connected to said shaft by a ratchet 23 and a spring pawl 24. The ratchet 23 and pawl 24 permit the shaft 21 to be driven independently of the clock mechanism and at a higher speed without disturbing the operation of the clock mechanism. When the vehicle is in hire, the gear 22 is in mesh with a pinion 25 mounted on a shaft 26 journaled in a swinging lever 27 pivoted at 30 on the longitudinal frame member 6, see Sheets 7 and 17 of the drawings. The shaft 26 carries a pinion 28 in mesh with a gear 29 mounted on the pivot 30. The gear 29 is driven from a clock 32 through gearing 31 Fig. 1 which may be of any well known construction. The above train of gearing is so proportioned, that a certain fare charge will be registered for a certain interval of time, which contingencies depend upon the traffic conditions under which the machine is operated. The cam 20 and the indicating wheel 10, actuated thereby, are driven as follows, from a wheel of the vehicle, when the cab is running over a certain predetermined speed. For example, over five miles per hour, which rate of speed is determined by the authorities of the various cities or municipalities.

The end of the shaft 21, exterior to the plate 1, is provided with a ratchet 33 engaged by pawls 34 on a gear 35. The ratchet 33 permits the shaft 21 to rotate independently of the gear 35, which independent movement occurs when the indicating wheels are being driven from the clock mechanism and when said wheels are being returned to a normal position. The gear 35 is in mesh with a pinion 36 attached to a pinion 37 which pinions are mounted on the end of a swinging lever 38, see Sheets 1, 5, 6 and 12. The pinion 37 is adapted to be placed in mesh with a gear 39 which is in mesh with a gear 40. The gears 39 and 40 are driven from a vertical shaft 41 through worm gears 42 and 43 and reverse ratchets which drive the indicating wheels in one direction irrespective of the direction of travel of the vehicle, and which will be hereinafter described. The vertical shaft 41 is journaled in bearings 47 and is driven from a short shaft 48 through a spring-controlled clutch consisting of upper and lower members 44 and 45 which will be hereinafter more fully described. The short shaft 48 is journaled in a bearing 46 and is connected with one of the wheels of the cab upon which the machine is placed, by a flexible shaft, which is a well known element. Also mounted on the shaft 9 is a unit dollar wheel 49 provided with a hub 50, Fig. 13 on which is secured a twenty tooth ratchet 51. The ratchet 51 is adapted to be engaged by a pawl 52 pivotally mounted on the frame 14. The pawl 52 is secured to and movable in unison (by means of a sleeve 53) with a pawl 54 in operative relation with a disk 55 secured to the hub 11 of the wheel 10 Figs. 6 and 7. The disk 55 is provided with two recesses 56, corresponding to the two series of numbers on the wheel 10 and which are adapted to receive the pawl 54. When indication (90) on the wheel 10 is opposite the sight opening in the casing, one of the recesses 56 will be in a position to receive the pawl 54, and when the frame 14 is depressed, the pawl 52 will be permitted to engage its respective ratchet 51 and to thereby register a unit on the dollar unit wheel 49. Also mounted on the indicator wheel shaft 9 is a "tens" and "hundreds" of dollars wheel 58 which is provided with a hub 59 to which is attached a twenty tooth ratchet 60 adapted to be engaged by a pawl 61 mounted on the frame 14 and movable in unison with a pawl 63 by means of a sleeve 62. The pawl 63 is in operative relation with a disk 64 secured to the hub 50 of the "unit" dollar wheel 49. The disk 64 is provided with recesses 56, identical with those in the disk 55, and which are adapted to receive the pawl 63 whenever the "unit" dollar wheel has been rotated sufficiently to add ten units on the wheel 58. The pawls 54 and 63 are provided with projections 13ª, Fig. 7 which hold them and the pawls 52 and 61 (connected thereto by means of the sleeves 53 and 62) out of the path of their respective ratchets when the frame 14 is in its extreme upper position. The twenty tooth ratchets 51 and 60, best shown in Fig. 13, are also provided with retaining pawls 12ª identical with the retaining pawl 12ª, Fig. 1 of the ratchet 12.

The ratchets 70 and 170 Figs. 9 and 13 are provided with blank spaces 70ᶜ adjacent to the normal or zero indication on the indicating wheel 68. When the ratchets 70 and 170 have have made one complete revolution, minus one-tooth of the ratchets, the pawls 71 and 171 Fig. 1 will engage the blank spaces 70ᶜ which prevents the wheel 68 overrunning the largest indication on the wheel.

*Supplemental counter for extra charges.—* The counter shaft 9 has also mounted upon it a counting wheel 68 provided with a hub 69 having a twenty tooth ratchet 70 secured thereto. This counting wheel is adapted to record extra charges, for example, for extra passengers and baggage. The ratchet 70 is adapted to be engaged by a pawl 71 mounted on a frame 72 secured to a shaft 73 journaled in the frame 7 and in the plate 4. See Sheets 4, 8 and 13. When the machine is in a normal position, the frame 72 is held in an extreme upper position by a pin 353 carried by the setting shaft 320 which will be described hereafter more in detail. When in this normal position, the pawl 71 is held out of engagement with the ratchet 70 by a projection 70ª, on the pawl, engaging the setting shaft 320, Sheet 8. When the setting shaft 320 permits the frame 72 to be depressed to permit the pawl to actuate the ratchet 70, the pawl is placed in engagement with said ratchet by a spring 71ª. The shaft 73 is in alinement with the rock shaft 15, but is movable independently thereof, Fig. 3. On the end of the shaft 73, exterior to the plate 4, is a projection 74 adapted to be engaged by one arm 75 of a lever pivoted at 77 and controlled by a spring 78. The other arm 76 of the lever is adapted to be engaged by a cam 79 freely mounted on the shaft 73. The cam 79 is provided with a ratchet 80 in operative relation with a pawl 81 which prevents retrograde movement thereof. The cam 79 is adapted to be rotated by any well known means such as a knob supported by the casing (not shown). During one complete revolution of said cam, it will depress the arms 76 and 75 and thereby actuating the projection 74 and elevating the frame 72. When said cam 79 rides off of the arm 76, the frame 72 will be depressed by a spring 82 attached to an arm 83 secured to the shaft 73. See Figs. 4, 9, 10 and 49. When the frame 72 is depressed the pawl 71 will engage the ratchet 70 and will rotate the counting wheel 68 to the extent of one indication on the periphery of said wheel.

*Type wheels for printing the tickets.—* Mounted in the frame 7 is a shaft 84 upon which is freely mounted a "unit" and "ten" cents printing wheel 85. To the left of said wheel 85, as seen from Fig. 13, Sheet 12, is a "unit" dollar printing wheel 86. The wheels 85 and 86 are provided with gears 90ª which mesh with idlers 87 mounted on frames 88. The idlers 87 are in mesh with gears 90 attached to the hubs 11 and 50 of the indicating wheels 10 and 49. See Fig. 13, Sheet 12. The indicating wheels 10 and 49 and the printing wheels 85 and 86 therefore rotate in unison. Adjacent to the wheel 86 is a "tens" and "hundreds" dollar wheel 91 which is rotated concurrently with the "tens" and "hundreds" indicating wheels 58 on shaft 9. Attached to the wheel 91 is a gear 92 in mesh with a gear 93 on a shaft 94 journaled in the frame 7 in the rear of the wheels 91 and 58, (see particularly Sheet 17, Figs. 31 and 32). The gear 93 is attached by means of a sleeve 93ª to a gear 95 in mesh with a gear 96 mounted on the hub 59 and movable with the "tens" and "hundreds" dollar wheel 58. The indicating wheel 58 and the printing wheel 91 will therefore rotate in unison.

Adjacent to the printing wheel 85, as seen in Fig. 13, Sheet 12, is a month printing wheel 97 rigidly secured to the shaft 84. Adjacent to the wheel 97 is a date printing wheel 98 rigidly secured to a shaft 99 which extends through the shaft 84. The shafts 84 and 99 extend out of the machine and the outer ends thereof, exterior to the casing, are provided with suitable indicating drums (not shown) by means of which the date wheels 97 and 98 are set in a well-known manner.

Adjacent to the wheel 98 are four type wheels 100 which constitute a consecutive number counter. The "unit" wheel of this counter is rigidly secured to a shaft 101, the outer end of which is provided with a gear 102 which is driven from the printing mechanism and by means of which the consecutive number counter is actuated. The operation of this counter will be described in connection with the printing mechanism. Adjacent to the consecutive number counter 100 is a supplemental counter printing wheel 103 adapted to print on the ticket or the receipt the specific supplemental charge or charges for baggage or extra passengers, etc. The wheel 103 is provided with a gear 104 which is in mesh with a pinion 105 mounted on a frame 106. The pinion 105 is in mesh with a gear 107 rigidly secured to the hub 69 of the supplemental fare indicating wheel 68 and by means of which the wheels 68 and 103 rotate in unison. The above bank of printing wheels, consisting of the wheels 91, 86, 85, 97, 100 and 103 and 98 are adapted to print on the ticket or receipt shown in Fig. 67, Sheet 21.

*Type wheels for printing the record.—* Mounted in the frame 8 are two portions of a shaft 109 upon one end of which, as seen from Fig. 13, Sheet 12, is a recording mileage counter 110. This counter is adapted to record the number of miles, in tenths, the cab travels when hired. This counter is driven from a wheel of the vehicle as follows. The "unit" wheel 111 of this counter is recessed on one side and receives springs 112 which engage a pin 113 on a gear 114. The gear 114 is in mesh with a gear 115 on shaft 116 journaled in the frame 8. The gear 115 is in mesh with a pinion 117 freely mounted on a shaft 118 and adapted to be connected therewith by a clutch 119. See Figs. 24 and 25, Sheet 15; also Fig. 11, Sheet 10. The clutch 119 is set by a lever 120 pivoted at 121 and partially controlled by a spring 122. The lever 120 is released to set the clutch, by the setting mechanism which will be hereinafter described. The lever 120 is provided with a spring-controlled latch 123 which is adapted to engage the pinion 117 when the clutch is not set and which prevents the mileage counter 110 being unintentionally actuated. The said mileage counter 110 may be provided with any suitable form of transfer mechanism 124. It is necessary to provide the resilient connection, consisting of the springs 112, as the counting wheel rotates continuously and not intermittently from one printing position to the other, and alining pawls are provided which move the wheels to printing positions when the printing mechanism is being actuated. The alining pawls will be hereinafter described. The shaft 118 hereinbefore referred to is journaled in a bearing 125, and on the frame members 1 and 6, and is provided with a gear 126 in mesh with a gear 127 attached to the gear 40 which is driven from the shaft 41 as is described in connection with the actuating means for the fare indicating wheels. See Fig. 5.

Adjacent to the recording mileage counter 110 is a total mileage counter 128, on shaft 109. This counter is similar to the counter 110 and is adapted to record the number of miles, in tenths, the cab travels under all conditions, that is, whether the cab is in service or not. The "unit" wheel 111 of this counter is driven from a pinion 129ª rigidly secured to the shaft 118 through a spring 112, pin 113, gear 114, gear 115, identical with the mileage counter 110. See Figs. 13, Sheet 12, and Fig. 24. It is to be understood that the counter 128 is actuated at all times when the cab is in motion.

Adjacent to the total mileage counter 128 on shaft 109 is a "cab out of use" time counter 129 which records in minutes the time the cab is hired and is out of use, for example, when repairs are being made on the vehicle. This counter is driven from the clock 32 as follows. Figs. 1, 3 and 13. The counter 129 may be provided with any suitable form of transfer mechanism 130 and the "unit" wheel 131 thereof is attached to a gear 132. See Fig. 8, Sheet 7. The gear 132 is driven from a gear 134, freely mounted on the shaft 9, through idlers 135 pivoted to the frame 7. The gear 134 is attached to a bevel gear 136 adapted to be engaged by a bevel gear 137 mounted on the shaft 26 carried by the lever 27. See Figs. 1, 8 and 34, Sheet 17. It will be remembered that the shaft 26 is driven by the clock 32 through the gears 28 and 29. The lever 27 is shifted by the setting mechanism to place the gears 136 and 137 in mesh as will be hereinafter described under the heading, "Setting mechanism."

Adjacent to the "Cab out of use" time counter 129 is the total cash fare counter 139 which totalizes all the cash fares exclusive of the extra charges. See particularly Fig. 13. The unit wheel 140 of this counter is attached to a shaft 141 to which is also secured, at the other side of the counter, a gear 142, which is in mesh with 130 an idler 143 which, in turn, is in mesh with a gear 144 freely mounted on the shaft 9. Attached to the gear 144 is a twenty-tooth ratchet 145 adapted to be engaged by a pawl 146 carried by the frame 14, see also Fig. 1. The ratchet 145 is actuated by the frame 14 concurrently with the ratchet 12 but independently thereof. This independent movement between the fare indicator and the cash counter is provided to permit the indicator to be set to zero, and the initial fare to be added on the counter. As the ratchets 12 and 145 are both actuated by the frame 14, the additional fare charges, indicated when the wheel 10 is rotated, will be added by the counter 139. The fare (50¢) initially indicated by the wheel 10 when the cab is first hired, is added to the total cash fare counter by mechanism controlled by the setting mechanism which will be hereinafter described. The counter 139 may be provided with any suitable transfer mechanism 147.

Adjacent to the counter 139 are the type wheels which print the specific fares. See Fig. 13. These wheels consist of a "unit" and "tens" cents wheel 148, a "unit" dollar wheel 149 and a "hundred" dollar wheel 150. The said wheels are identical with the wheels 85, 86 and 97 which print on the ticket, and rotate in unison therewith. The wheels 148 and 149 are provided with gears 151 which mesh with idlers 152 on the frames 88. The idlers 152 mesh with the gears 90 on the hubs 11 and 50 of the wheels 10 and 49. The wheel 150 is provided with a gear 153 in mesh with a gear 154, journaled freely on the hub 50, and in mesh with a gear 155 attached to the wheel 91.

Adjacent to the wheels 148, 149 and 150 are the wheels 156 and 157 which print the dates on the record. See Figs. 13 and 7. The said wheels 156 and 157 are provided with gears 158 which mesh with gears 159 journaled on the shaft 9. The gears 159 mesh with the gears 160 attached to the wheels 97 and 98. The wheels 156 and 157, and 97 and 98 therefore rotate in unison.

Adjacent to the wheels 156 and 157 are the type wheels 160ª which print the consecutive numbers on the records. Each of the said wheels 160ª is driven independently of its corresponding wheel 100 of the counter which prints on the ticket, by gears 161. The transfer gears 162ª for both of these counters may be mounted on the shaft 116 in operative relation with the lower bank of counters, 160ª.

Adjacent to the counting wheels 160ª on the shaft 109 is a type wheel 162 which is adapted to print the specific extra fare charges on the records. This wheel 162 is actuated concurrently with the indicating wheel 68 and with the wheel 103 which prints the specific extra charges on the tickets. The said wheel 162 is provided with a gear 163 in mesh with a pinion 164 on the frame 106. The pinion 164 is in mesh with the gear 107 attached to the hub 69 of the "extra charge" indicating wheel 68. The wheels 103, 68 and 162 therefore rotate in unison.

Adjacent to the wheel 162 is a "total extra charge" counter 165. See Figs. 13 and 27, Sheets 12 and 16. The "unit" wheel 166 of this counter is provided with a gear 167 in mesh with an idler 168, which in turn is in mesh with a gear 169 on shaft 9. Attached to the gear 169 is a twenty-tooth ratchet 170 adapted to be engaged by a pawl 171 carried by the frame 72. See Figs. 1 and 9. The pawl 171 is movable with the pawl 71 by means of a sleeve 172. The ratchets 70 and 170 are therefore actuated at the same time, and consequently the extra charges indicated by the wheel 68, will be added on the counter 165. The counter 165 may be provided with transfer gears 173 of any well known type.

*Means for resetting the counter wheels.*— Mounted on the hubs 11, 50, 59 and 69 of the indicating wheels 10, 49, 58 and 68, and on the shaft 21, are spiral cams 175 which are adapted to be engaged successively by pawls 176 and 177, there being a pawl 176 and 177 for each cam 175. The object in returning the shaft 21 to a normal position is to place the recess 67 and the cams 20 in their proper positions, relative to the latch 65 and the projection 19, to begin the registration of a new fare. See Figs. 43 and 46, Sheet 19. The pawls 176 are mounted on a tubular shaft 178 journaled on a shaft 203 which is part of the printing mechanism. Mounted on the said shaft 178, as is particularly shown in Fig. 49, Sheet 20, is an arm 180 to which a spring 181 is attached. The spring 181 exerts a force to move the pawls 176 against the cams 175 to cause the indicating wheels and the shaft 21 to initially rotate. The pawls 177 are mounted on a rectangular shaft 182 journaled in the plates 3 and 4, and are provided with an arm 183 to which springs 184 are secured. The springs 184 exert a force to move the pawls 177 against the cams 175 to subsequently move the indicating wheels and the shaft 21 to normal position. The pawls 176 primarily move the indicating wheels and shaft 21, while the pawls 177 complete the movement. It will be seen from Fig. 7, that the pawls 176 are adapted to act as stops for the cams 175 to limit them to their normal position. The said pawls 176 and 177 are moved from engagement with the cams 175 by cams 186 and 190 carried by the setting mechanism, hereinafter described, and are held in the position shown in Fig. 46, Sheet 19, to permit the indicating wheels to be freely rotated to count the fares, by the following means. Mounted on the shaft 178 is is an arm 185 adapted to be depressed by the cam 186. The arm 185 is held in its depressed position, with the pawls 176 away from the cams 175, by a spring-controlled latch 187 pivoted at 188 to the plate 2. Mounted on the square shaft 182 is an arm 189 adapted to be rocked by the cam 190. The arm 189 is held in a set position by a spring-controlled catch 191 carried on the arm 185. The arm 189 is provided with a recess 192 adapted to receive the catch 191, when the arm 185 has reached the end of its resetting movement. The catch 187 is released by a pin 193 mounted on the cam 186. See Figs. 43 and 45, Sheet 19. When the catch 187 releases the arm 185, the spring 181 will rock the shaft 178 and the pawls 176 will initially rotate the cams 175 to normal position. When the catch 191 reaches a position opposite the recess 192, the springs 184 will rock the shaft 182, and the pawls 177 will complete the resetting of the cams 175. In some cases the cams 175 will be near enough to normal position that it is only necessary that they be engaged by the pawls 177, but in all cases the pawls perform their cycle of operations.

*Printing mechanism.*—The upper bank of ticket printing wheels is adapted to be engaged by a platen 195 while the lower bank of record printing wheels is adapted to be engaged by a platen 196. Figs. 2 and 7. The platens 195 and 196 are mounted on horizontally movable frames 197 and 198. The frame 197 is mounted in bearings 199 on the inner side of the plate 1, while frame 198 is mounted in bearings 199 on the outer side of the plate 4. The said platens 195 and 196 are moved to and held in an outer normal position by springs 220. The frames 197 and 198, and platens carried thereby, are actuated to secure impressions, by cams 201 adapted to engage rollers 202 on the frames 197 and 198, Fig. 10. The said cams 201 are mounted on a shaft 203 journaled in the plates 1, 2, 3 and 4. The end of said shaft, exterior to the plate 4, is provided with a gear 204 in mesh with a pinion 205 mounted on a stud 206. Fig. 14, sheet 13. The pinion 205 is connected with a crank 207 journaled in the casing 208, and by means of which the shaft 203 is rotated to secure the impressions or records. Attached to the gear 204 is a ratchet 209 engaged by a spring-controlled pawl 210 which prevents retrograde movement of the printing mechanism.

When the impressions are being made, the pawls of the fare counting wheels are in operative relation with their ratchets and to prevent the rotation of the fare counting wheels while the impressions are being made, the pawls for said fare counters are elevated by the printing mechanism as follows. See Figs. 1 and 12. It will be remembered that the pawls 13, 52, 61 and 146, which actuate the fare counters, are carried by a frame 14, mounted on the shaft 15. Mounted on the said shaft 15, adjacent to the plate 1, is an arm 460 to which an arm 461 is pivoted at 462. The arm 461 is partially controlled by a spring 463 and is provided with a pin 464 which engages the end of the arm 460 (see Fig. 12). When the pawls 13, 52, 61 and 146 are in operative relation with their counters, the arms 460 and 461 will occupy approximately the position of the dotted lines in Fig. 12, Sheet 11; the exact position depending on the position of the cam 20. See Figs. 43 and 44. When in this position, the end 465$^a$ of the printing frame 197 will engage a cam surface 466 on the arm 461, during the forward movement of the printing mechanism, thereby rocking the shaft 15 and elevating the pawls 13, 52, 61 and 146 out of operative relation with the ratchets of their counter wheels. When the frame 197 reaches the end of its forward stroke, a recess 467 in the end of the frame 197 will receive the end 465 of the arm 461, and during the return movement of the frame 197, the pawls will be maintained in their elevated position as the arms 460 and 461 will act as a toggle. When the printing frame 197 reaches the end of its return movement, the arm 461 will engage the bearing 199, and will be disengaged from the recess 467, thereby permitting the pawls to be placed under the influence of the setting mechanism.

When the printing mechanism is actuated, an audible signal is given by a bell 475 mounted on a bracket 476 extending from the plate 4. The bell 475 is adapted to be struck by a tappet 474 mounted on lever 470. The lever 470 is pivoted at 472, is controlled by and held normally against a stop 477. The upper end of the lever 470 is adapted to be engaged by a cam 471 mounted on the shaft 203 of the printing mechanism. When the shaft 203 is rotated, the cam 471 rocks the lever 470 against the tension of the spring 473, and when said cam 471 releases the lever, said lever will engage the stop 477 and enable the tappet 474 to have a continued movement to strike the bell.

The consecutive number counters 100 and 100$^2$ are actuated by the printing mechanism by devices shown in Fig. 9. Mounted on the shaft 203 is a one-tooth gear 211 adapted to engage a Swiss gear 212 pivoted on the frame 7. Attached to the gear 212 is a gear 213 in mesh with the gear 102 on the consecutive counter actuating shaft 101 before referred to. The gear 211 is adapted to rotate the gears 212 and 102 one-tenth of a revolution during each revolution of the printing shaft 203. The consecutive counters are therefore actuated each time the printing mechanism is operated.

*Inking mechanism.*—In operative relation with the lower bank of record printing wheels is an inking roll 215, and in operative relation with the upper bank of ticket printing wheels is an inking roll 216. Fig. 11, Sheet 10. The upper roll 216 is given a greater extent of travel than the lower roll to permit said upper roll to ink a plate 217. Fig. 7, Sheet 6. The plate 217 is mounted on the frame 7 and is adapted to print the data, such as the name of the company operating the taximeter, on the tickets as will be seen from Fig. 67, Sheet 21. The upper roller 216 is mounted on the upper ends of carriers 218 the lower ends of which are pivoted at 219 to vertically sliding plates 220ª. Fig. 14, Sheet 13. The plates 220ª are movable in guides 221 mounted on the plates 2 and 4, and are provided with pins 222 which form racks, as shown more clearly in Fig. 11. The pins 222 are engaged by segment gears 223 mounted on a rock shaft 224 journaled in the plates 3 and 4. The segment gear 223 shown in Fig. 9 is provided with an extension which carries a roller 225, in operative relation with a cam 226 mounted on the printing shaft 203, as is particularly shown in Fig. 29. During the initial movement of the shaft 203, the cam 226 will elevate the segment gears 223 which will thereby elevate the sliding plate 220, the carriers 218, and the upper inking roll 216. The upper roll 216 is maintained in contact with the surfaces to be inked by springs 227 which are attached to pins on the carriers 218 and sliding plates 220ª. The lower roll 215 is mounted on carriers 228 pivoted at 229 to vertical sliding plates 230. The plates 230 are provided with elongated recesses 231 which receive guide pins 232 carried by the sliding plates 220ª. When the gears 223 are actuated, the plates 220ª will be initially moved, and when the pins 232 reach the upper ends of the recesses 231, said plates 220ª will elevate the plates 230 a distance sufficient for the inking-roll 215 to ink the lower bank of record printing wheels. The inking roll 215 is maintained in contact with the surfaces to be inked by springs 233 which are connected to pins carried by the carriers. The shape of the cam 226 is such that the gears 223 are both elevated and depressed by said cam. The said cam 226 is provided with a recess 234 which receives a spring-controlled pawl 239 which rests in said recess when the printing mechanism is in a normal position. The resistance offered by the pawl 239 indicates to the operator when the shaft 203 has made a complete revolution.

*Paper feeding mechanism.*—Attached to the ratchet 209 is a one-tooth disk gear 240 provided with a tooth 241 adapted to engage a Swiss gear 242 mounted on a shaft 243, see Sheet 14, also Figs. 4 and 7. The tooth 241 is adapted to partially rotate the shaft 243 during each revolution of the printing shaft 203. The said shaft 243 is journaled on the plates 2, 3 and 4, and is provided with feed rollers 245 in operative relation with similar rollers 244 on a shaft 246. The paper strip 247, upon which the records are printed, is unwound from a roll 248 mounted on a shaft 249 supported by side frames 250 mounted between the plates 2 and 3. The said paper strip 247 extends upwardly between the lower bank of printing wheels and the platen 196, and over a guide support 251, Fig. 7 mounted on the platen 196 and thence downwardly between the feed rollers 244 and 245 and into a storage space 252. A curved shield 253 is provided above the platen 196 to guide the paper strip 247 when being inserted in the machine.

Attached to the gear disk 240 on the shaft 203 is a mutilated gear 254 in operative relation with a Swiss gear 255 mounted on a stud 256. Fig. 14, Sheet 13, and Fig. 19, Sheet 14. Attached to the gear 255 is a gear 257 in mesh with an idler 258, Fig. 4 which in turn is in mesh with a pinion 268 on a shaft 259. The shaft 259 is journaled on the plates 2 and 4 and is provided with rollers 260 in operative relation with rollers 261, Fig. 7 on a shaft 262 journaled in the plates 2 and 4. The paper strip 263, from which the ticket is printed, is unwound from a roll 264 mounted on a shaft 265 supported by a swinging frame 266 pivotally mounted on a rod 267 extending from the plates 3 and 4. The said strip extends upward from the roll 264 between the plate 217, the ticket printing wheels and the platen 195, and between the feed rollers 260 and 261 and past a severing knife 269ª and out of the machine. The feeding rollers 244 and 245 and the rollers 260 and 261 are separated to permit of the insertions of the paper strips by the following device. See Figs. 8, 9, 22 and 23.

Each of the shafts 246 and 262 is provided with eccentric bearings 269, and is also provided with arms 270 engaged by springs 271 which maintain the feed rollers in contact. The eccentric bearings 269 at one end of the machine are provided with mutilated pinions 272 in mesh with racks 273 mounted in bearings 274 on the inside of the plate 4. The racks 273 carry rollers 275 adapted to be engaged by cam levers 277 pivoted at 278. The levers 277 extend out of recesses in a plate 279 and are adapted to be depressed to actuate the racks 273 to rock the shafts 246 and 262 on their eccentric pivots 269. The said levers 277 are held in their depressed positions by the rollers 275 entering recesses 280 therein, at which time the levers 277 are fully depressed.

*Alining pawls for type wheels.*—Attached to the type wheels 156 and 157 which print the date on the record, are star wheels 281 engaged by spring-controlled pawls 282 mounted on the shaft 116, Fig. 7, Sheet 6. The ends of the pawls 282 ride in and out of the recesses in the star wheels 281 and indicate to the operator when the type wheels are in printing positions.

The transfer gears 124, of the mileage counters 110 and 128; the transfer gears 130 of the "cab out of use" time counter 129; the transfer gears 147 of the total fare cash counter 139; the transfer gears 162$^a$ of the consecutive number counter 160, and the transfer gears 173 of the total extra charge counter are provided with ten tooth star wheels 283, shown more clearly in Fig. 8 and Fig. 28, Sheet 16. The wheels 283 are adapted to be engaged by pawls 284 rigidly secured to a shaft 285 journaled in the plates 3 and 4. Attached to the shaft 285 is an arm 287 which is connected by a link 288 to a bell crank lever 289 in operative relation with a cam 290 on the printing shaft 203. The link 288 is provided with a hook 291 which receives a spring 292 which exerts an upward influence on the pawls 284. When the shaft 203 is initially rotated, the cam 290 releases the bell crank lever 289 and permits the spring 292 to move the pawls 284 in engagement with the star wheels 283 and to thereby move their respective printing wheels to printing positions. When the printing shaft 203 again resumes its normal position, the cam 290 will move the pawls 284 away from the star wheels 283, thus permitting the respective type wheels to be moved by their actuating mechanism. It is necessary to provide these alining pawls, owing to the back lash in the actuating or setting gears of the various printing wheels.

*Identification and locking key.*—All of the mechanism of the machine, with the exception of the total mileage counter and date wheels is adapted to be locked by an identification key as follows. Attached to the plate 4 and extending through openings 295 in the plates 3 and 4 is a key housing 296 adapted to receive a sliding key 297. Sheet 13. The said key 297 is provided with type 298 which, when it is within the housing, is in printing alinement with the lower bank of record printing wheels and is adapted to print on the record the identification of the operator of the machine as will be seen at the extreme right in Fig. 56. The housing 296 is provided with a projection 299 to which is pivoted at 300 an unlocking lever 301. The end 301$^a$ of said lever 301 is adapted to be engaged by a projection 302 on the key to rock said lever when said key is inserted. See Fig. 55, Sheet 21. When the key is removed, a projection 303 thereon is adapted to move said lever 301 in the opposite direction. The other end of the said lever 301 is in engagement with the lower end of a lever 304 pivoted at 305, (Fig. 4) and the upper end of which is normally in the path of a shoulder 306 on a disk 307 carried by the setting mechanism hereinafter described. When the key 297 is inserted, the upper end of the lever 304 will move out of the path of the shoulder 306 thereby permitting the setting mechanism to be actuated, and, when said key is removed, the upper end of said lever will move in the path of the shoulder 306, thereby locking the setting mechanism. To prevent a foreign instrument being inserted in the housing 296 to actuate the lever 301 and to thereby unlock the setting mechanism, the following means is provided. The lever 301 is provided with a projection 308 which is pivotally attached at 309 to one end of a member 310 slidingly mounted on the top of the housing 296. The other end of the member 310 is provided with an elongated seat 311 which receives a pin 312 mounted in the housing 296 and in an extension 313. The said pin 312 is controlled by a spring 314 and is provided with an enlargement 315 adapted to engage a shoulder 316 on the sliding member 310. See Fig. 17, Sheet 13. The lower end of said pin 312 is adapted to be engaged and elevated by a cam surface 317 on the end of the key 297. When said pin 312 and the enlargement 315 carried thereby are elevated, the sliding member 310 is unlocked and the lever 301 is permitted to be shifted by the projection 302. It will be seen that it is necessary for the pin 312 to be elevated before the lever 301 can be shifted in order to prevent any other instrument than the key unlocking the machine.

*Setting mechanism.*—All of the mechanism of the machine, with the exception of the total mileage counter and the date wheels, is placed in operation at the time the passenger hires the cab, and is placed out of operation, when the passenger discharges the cab, by a setting mechanism constructed and operated as follows. Extending substantially the length of the machine, and journaled in the plates 1, 2, 3 and 4 at the upper forward position thereof, is a rock shaft 320. On the left end of the shaft, as seen from Fig. 1, is the well known flag crank 321 of a taximeter. This crank 321 and the rock shaft 320, actuated thereby, have three positions. The first position is the normal position, when said flag crank is in an upper vertical position and the machine is out of use and the vehicle is not in hire. The second position is the operating position, when said flag crank 321 is in an intermediate horizontal position, the cab is hired, the machine is in use and the fare is being recorded either according to the distance traveled or the time consumed. The third position is a "cab out of use" position, for example, when the flag crank 321 is in a lower vertical position, the cab is in hire but is out of use owing to causes out of the control of the passenger such as when repairs are being made to the vehicle. In this position, the only portion of the machine in operation is the cab out of use time counter 129. Fig. 13.

As shown particularly in Fig. 5, the left end of the shaft 320 is provided with a disk 323 having three recesses 324 corresponding to the three positions of the setting mechanism. The said sk 323 is in operative relation with a roller 325 mounted on the upper end of a lever 326 pivoted at 327 and controlled by a spring 328. When the shaft 320 is rocked from one position to the other, the said roller rides from one recess 324 to the other, and when said shaft 320 is in any one of its positions, the spring 328 will hold the roller 325 in one of the recesses 324 and thereby form a resilient locking means for the setting mechanism. In shifting the setting mechanism from one position to the other, a signal is given by a bell 329, which is adapted to be engaged by a spring-controlled tappet 330 mounted on one end of a spring-controlled lever 331. The other end of the lever 331 is adapted to be engaged by a spring-controlled pawl 332 mounted on the lower end of a projection 333 extending from the lever 326. When the lever 326 is rocked, the pawl 332 will engage the lever 331 to elevate the tappet 330. The pawl 332 is guided by a pin 334 which releases said pawl 332 from said lever 331 after said lever has been elevated, thus permitting the same to descend under the influence of its spring and to thereby ring the bell 329.

Mounted on the shaft 320, adjacent to the disk 323 is a cam 335, as is particularly shown in Figs. 3, 5 and 26. This cam 335 controls the operative relation between the fare counters and the actuating means driven from the wheel of the vehicle, and also controls the movement of the clock mechanism. The said cam 335 is in operative relation with the lever 38 heretofore referred to under the heading "Indicating wheels and their actuating mechanism". The said lever 38 is mounted on a boss 386 on a yoke 387 and is partially controlled by a spring 388. On the lower end of said lever 38 is the gear 36 adapted to be placed in mesh with the gear 39 by the cam 335 and spring 388. When the gears 36 and 39 are in mesh, the setting means is in its second position and the fare recording and indicating wheels may be driven from the wheel of the vehicle. Also in operative relation with said cam 335 is the upper end of a lever 389 pivoted at 390. The lower end of said lever 389 is in operative relation with one arm of a bell-crank lever 391 pivoted at 392 and controlled by a spring 395. The other arm of the bell crank lever 391 is provided with a spring extension 393 which is adapted to engage the balance wheel 394 of the clock 32 when the setting mechanism is in its normal or first position. When the setting mechanism is in its second and third position, the balance wheel 394 is released and the clock mechanism is set in operation.

Mounted on the shaft 320, between the plates 1 and 2, is another cam 336 which is in operative relation with the lever 120 heretofore referred to, see particularly Figs. 3, 11 and 24. The cam 336 is provided with a projection 337 which is in engagement with the upper end of the lever 120 when the setting mechanism is in its first position. The lever 120 is hereinbefore referred to under the heading "Type wheels for printing the record". When the setting mechanism is in its second and third position, the projection 337 releases the lever 120, thus permitting the spring 122 to throw in the clutch 119 to place the recording mileage counter 110 in operation.

To the right of the cam 336, as seen from Fig. 1, and on the inside of the plate 2 is the cam 186. See Figs. 1, 43 and 45, Sheet 19. The cams partially control the initial resetting pawls. When the setting mechanism is moved from its first to its second position, the cam 186 depresses the arm 185 thereby removing the pawls 176 from engagement with the cams 175. The cam 186 also carries the pin 193 which releases the latch 187 from engagement with the arm 185, when the setting mechanism is returned to its first or normal position, thereby permitting the pawls 176 to engage the cams 175. To the right of the cam 186 is the cam 190 which is adapted to actuate the arm 189 to move the pawls 177 from the path of the resetting cams 175 when the setting mechanism is moved from its first to its second position.

To the right of the cam 186, as seen in Fig. 3, is a cam 340 in operative relation with a pin 341 on the arm 18. See also Fig. 44, Sheet 19. When the setting mechanism is in its first or normal position, the cam 340 holds the frame 14 and the pawls 13, 54, 52, 63, 61 and 146 in an extremely elevated position; this permits the projections 13ᵃ, as shown in Fig. 7, to hold the pawls 146, 61, 63, 52, 54 and 13 out of operative relation with their respective ratchets, thereby enabling the ratchets and the wheels connected thereto to be easily reset to zero. When the setting mechanism is moved to its second position, the cam 340 permits the frame 14 to be depressed thus permitting the pawls to be placed in engagement with their respective ratchets and to actuate the same when the frame 14 is actuated by the four leaf cam 20 to record the fare. This cam is referred to under the heading "Indicating wheels and their actuating mechanism".

To the right of the cam 340 Fig. 3, is a cam 342 adapted to shift the lever 27. See also Figs. 1, 8, 33 and 34. The lever 27, which has been referred to in describing the indicating wheels, etc., is provided with two arms 343 pivoted at 344, and is controlled by a spring 345 and held in a central position by a pin 346. The upper ends of said arms 343 are adapted to engage the cam 342 and the resilient connection thus formed allows the lever 27 to yield when the teeth of the gears 22 and 25 or 136 and 137 come "top on top" during the shifting of said lever 27. When the setting mechanism is in its first or second position, the cam 342 maintains the gears 22 and 25 in mesh thus permitting the clock to drive the fare counting wheels when the vehicle is hired. When the setting mechanism is moved to its third position, the lever 27 is shifted to place the gears 136 and 137 in mesh, thus permitting the clock to drive the non-recording time counter 129 to record the length of time the vehicle is out of use, for example, when making repairs while the vehicle is in hire.

Mounted on the shaft 320 of the setting mechanism, and to the right of the cam 342, as seen in Fig. 1, is the initial fare adding device which adds the initial fare to the total fare cash counter. This device will be more fully described under a separate heading. To the right of said initial fare adding device is a cam 343ª which actuates a blind 344ª for the cents fare indicating wheel 10. See also Figs. 1 and 30, the latter on Sheet 16. It will be remembered that the initial fare (50¢) is opposite a sight opening (not shown) in the casing when the wheel 10 is in a normal position, and this blind is provided to conceal the said initial fare when the setting mechanism is in its first position, and the machine is out of use. The cam 343ª is adapted to engage a roller 345ª mounted on the upper end of a bell crank lever 346ª, pivoted on the shaft 9 and partially controlled by a spring 347ª. Extending from the upper end of the lever 346ª, is an arm 348ª upon which the blind 344ª is mounted. When the setting mechanism is moved from its first to its second position, the cam 343ª will elevate the blind 344ª, and when said setting mechanism is returned to its first position, the blind will be lowered by the spring 347ª.

To the right of the cam 343ª, on shaft 320, is a pinion 349 which actuates an indicator 350 which discloses, through a sight opening (not shown), the three positions of the setting mechanism, see particularly Figs. 1, 3 and 13. The indicator 350 is provided with three indications; the first, "For hire," indicating the first position of the setting mechanism; the second, "Hired," indicating the second position of the setting mechanism; and the third, "Stopped," indicating the third position of the setting mechanism. The said indicator 350 is mounted on a segment gear 351 journaled on the shaft 9 and in mesh with the pinion 349. The ratio of the pinion 349 and gear 351 is such that the indicator 350 is moved its proper distance during the movement of the setting mechanism from one position to the other.

To the right of the pinion 349 on the shaft 320 is a pin 353 adapted to engage the frame 72 of the "extra charge" counter, see Figs. 1 and 9. When the setting mechanism is in its normal or first position, the pin 353 engages the frame 72 and holds the same in an extreme upper position, thereby holding the pawl 71 clear of the ratchet 70 and permitting the "extra charge" wheel 68 to be easily set to zero. When the setting mechanism is moved to its second position, the pin 353 releases the frame 72 thereby permitting said frame to be actuated by the cam 79, in the manner heretofore described.

Mounted on the shaft 320, to the right of the pin 353, is a full stroke mechanism which will be described under a separate heading, and on the extreme right end of said shaft 320 is a disk 307 which is described in connection with the identification key. Attached to the outer side of the disk 307 is a disk 355 which coöperates with interlocking mechanism which compels the operation of the printing mechanism after the setting mechanism is moved from its normal position and before it is returned to its normal position. This disk 355 will be again referred to under the heading, "Interlocking mechanism."

*Initial fare adding device.*—As stated in the description of the cash fare total counter 139, the "unit" wheel 140 of that counter is driven from the ratchet 145 attached to the gear 144 when any fares in addition to the initial fare is being registered on to the counter 139. The initial fare is also added to the counter 139 by rotating the gear 144. This mechanism is best shown in Figs. 1, 13, and 36 to 42 inclusive. In mesh with the gear 144 is an idler 360 which, in turn, is in mesh with a gear 361 freely mounted on the shaft 320. Attached to the gear 361 is a ratchet 362 adapted to be engaged by a pawl 363 partially controlled by a spring 364, see sheet 18. The pawl 363 is pivotally mounted on a disk 365 rigidly attached to the shaft 320. When said shaft 320 is in its normal position, or in other words, the setting mechanism is in its first position, the pawl 363 is in engagement with the ratchet 362. A movement of the shaft 320 from its first to its second position, will cause the pawl 363 to rotate the ratchet 362 and thereby the "unit" wheel 140 of the "total fare" counter, through the gears 361, 360, 144, 143 and 142. When the pawl 363 has moved said "unit" wheel 140 a distance sufficient to record the initial fare on the counter 139, the pawl 363 will be disengaged from the ratchet 362 by a cam 372 which engages a pin 366 on the pawl 363. During the continued movement of the shaft 320 from its first to its second position, and during the movement of the said shaft from its second to its third position, the pawl 363 will be held out of engagement with the ratchet 362 by the concentric surface 367 of the cam 372. When the fares, in addition to the initial fare, are being added to the counter, the setting mechanism will be in its second position, and the pawl 363 will be held out of engagement with the ratchet by the concentric surface 367, thereby preventing the pawl 363 obstructing the movement of the counter when the said counter is being actuated by the pawl 146. When the shaft 320 is being returned to its first position, the pawl 363 will be prevented from engaging the ratchet, by a guide 368 mounted on a laterally movable spring plate 369 attached to an adjustable arm 370. Upon the return movement of the shaft 320, when it reaches its first position, the end 371 of the guide 368 will permit the pawl 363 to be placed in engagement with the ratchet 362 by the spring 364, and when said shaft 320 is then initially moved from its first position, the pin 366 will engage the end 371 of the guide 368 and will push said guide 368 out of its path, and will hold said guide in this position until the pin 366 and pawl 363 are elevated by the cam 372, at which time the guide 368 will be moved into the path of the returning pin 366 by the spring plate 369. The cam 372 is normally stationary and is held in its position by a pin 373 on the arm 370, which pin enters one of a series of openings 374 in the cam. A plurality of such openings 374 is provided in said cam 372 to permit it to be adjusted to add different initial fares on the counter 139, Fig. 13. The adjustable arm 370 is held in position by a thumbscrew 375 which is mounted on the frame 7. This arm 370 is made adjustable to permit the cam 372 to be slightly adjusted in any one of its positions.

The ratchet 145 and the counter 139 are prevented from being overthrown by a pawl 376 mounted on the shaft 320 and normally held out of engagement with the ratchet 145 and against a stop 377 by a spring 378. The pawl 376 is provided with an extension 379 adapted to be engaged by a swinging member 380 pivotally mounted on the pawl-carrying frame 14. The extension 379 is adapted to be engaged by a projection 381 extending from a lever 382 pivoted to a bracket 383. The lower end of said lever 382 is adapted to be engaged by a cam 384 carried by the shaft 320. The position of the cam 384 is such, that, when the setting mechanism is being moved to its second position, the cam 384 will engage the lever 382 the moment the cam 372 throws out the pawl 363. When the cam 384 engages the lever 382, the projections 381 will engage the swinging member 380 which operation will rock the pawl 376 and will place the same in engagement with the ratchet 145, thereby preventing further rotation of the ratchet 145. The object in providing the swinging member 380, is to permit the pawl 376 to be disengaged from the ratchet 145 without returning the setting mechanism and the cam 384 to their normal position, thereby permitting the ratchet 145 to be subsequently actuated by the pawl 146 to add the subsequent fares. When the cam 340, shown in Fig. 44, Sheet 19, permits the arm 18 and the frame 14 to descend, to place the pawls carried thereby in operative relation with their ratchets, the lowering of the frame 14 also lowers the swinging member 380, and thereby releases the extension 379 and permits the spring 378 to place the pawl 376 out of engagement with the ratchet 145.

*Full stroke mechanism.*—Mounted on the shaft 320 is a disk 400 having a blank space 415 and two sets of teeth 401 and 402 which point in opposite directions. See Fig. 1, and Sheet 20 of the drawings. The teeth 401 and 402 are in operative relation with pawls 403 and 404 integrally united and pivoted on a pin 405. These pawls 403 and 404 are provided with an arm 406 adapted to be engaged by pins 407 and 408, carried by the disk 400, to shift the pawls 403 and 404. The said pawls 403 and 404 are held in either of their shifted positions, and are permitted to ride in and out of the ratchet teeth, by a pawl 409 pivoted at 410 and controlled by a spring 411. The pawl 409 is provided with a wedge-shaped end 412 adapted to engage a V-shaped projection 413 extending from the pawls 403 and 404. When the end 412 is on the right side of the projection 413, as seen in Fig. 52, the pawl 403 is in engagement with the ratchet teeth, and when said end 412 is in engagement with the left side of the projection 413, the pawl 404 is in engagement with the ratchet teeth.

The normal position of the mechanism is shown in Fig. 51, as when the flag crank 321 is in its elevated or first position. In Fig. 52, sheet 20, the crank 321 has been moved to its second position and it will be noted that the teeth 401 of the ratchet 400, prevent the crank 321 being returned to the first position. In Fig. 53, the crank 321 has been moved to its third position, and it will be noted, the pin 408 has engaged the arm 406 and thrown the pawl 404 in engagement with the disk 400 and against a shoulder 414; this prevents the crank 321 being moved farther. It will be noted that when the parts are in this position, the crank 321 can be moved at will from its third to its second position or from its second to its third position without returning said crank to its first position as the pawl 404 is in engagement with the blank space 415 of the ratchet 400. From the position shown in Fig. 53, the crank 321 may be moved to the position shown in Fig. 54 where the crank is in its first position. During this return movement, said crank will be prevented from being moved backward by the teeth 402 after it passes its second position. When it reaches the position shown in Fig. 54, it is necessary to move said crank a slight distance farther to permit the pin 407 to shift the pawl 404 out of engagement with the ratchet teeth 402 in order that said crank may descend. This additional movement of said crank moves the pawls from the position shown in Fig. 54 to that shown in Fig. 51, and absolutely insures the return of said crank to its first position before it may be again depressed to its second or third position. It will be noted, that it is necessary to move said crank 321 to its third position before it can be returned to its first position, but said crank may need only occupy this position, to-wit, the third position, momentarily unless repairs are being made to the cab.

*Interlocking mechanism.*—The purpose of this mechanism is to compel the actuation of the printing devices, and the paper feeding devices actuated thereby, after the setting mechanism has moved from its first position and before it is returned to said position. The disk 355 on the shaft 320, before referred to, is provided with a projection 416 and a shoulder 417 having a cam surface 418 thereon. See Figs. 4 and 20. In operative relation with said disk 355 is a pawl 419 provided with a cam surface 420. The pawl 419 is partially controlled by a spring 421 and is mounted on the stud 206. Also mounted on the stud 206 is a pawl 422 normally connected to said pawl 419 through a pin 423 and a spring 424 which connection permits said pawl 422 to be moved independently of the pawl 419. The said pawl 422 is provided with a tooth 425 which is adapted to engage a recess 426 in the disk 209 to lock the printing mechanism against operation. The pawl 419 also is provided with an extension 427 to which a catch 428 is pivoted. The catch 428 is partially controlled by a spring 429, and the movement thereof is limited by pins 430 on pawl 419. The catch 428 is adapted to be engaged by a pin 431 carried by the gear disk 210 at the end of the actuation of the printing mechanism. When the setting shaft 320 and the flag crank 321, carried thereby, is in its first position or that shown in Figs. 1 and 18, the projection 416, on disk 355, in connection with the pawl 419, acts as a stop to prevent retrograde movement of the setting mechanism. When the said crank 321 is moved to its second position, or that shown in Fig. 19, the upper end of the pawl 419 will be placed, by the spring 421, in the path of the shoulder 417, and prevents the flag crank being returned to its first position. Upon a movement of the pawl 419 in the path of the shoulder 417, the tooth 425 of the pawl 422 will be elevated out of the recess 426 which operation unlocks the printing mechanism, and the same must then be actuated to move said pawl 419 out of the path of the shoulder 417. Upon operating the printing mechanism by rotating the crank 207 and the gear 204, the pin 431 will engage the catch 428 at the end of the rotating movement of the gear disk 240, and when said pin 431 so engages said catch 428, the pawl 419 will be shifted to the position shown in Fig. 20, Sheet 14, at which time the cam surface 420 of the pawl 419 will be in the path of the cam surface 418 of the disk 355. When in this position, the printing mechanism may be further actuated to take a second impression, or the setting mechanism may be returned to its first position. When the setting mechanism and the flag crank 321 carried thereby is returned to its first position, the pawl 419 will be moved to the position shown in Fig. 18, and the movement of the pawl 419 and the projection 427 carried thereby will release the catch 428 from engagement with the pin 431. The flag crank 321 can be moved from its second to its third position or from its third position to its second position without disturbing the interlocking mechanism.

It will be remembered, that, when the setting mechanism is moved from its first to its second position, an initial fare is added on the total fare counter. To permit a statement or impression to be made by an inspector or auditor or one who does not collect a fare, the following means is provided which enables the printing mechanism to be unlocked and actuated by authorized persons, without moving the setting mechanism from its first position. As above stated, the pawl 422 is normally carried by the pawl 419 and is capable of independent movement thereof. The said pawl 422 is provided with an arm or projection 435 to which is attached a link 436 having a pin 437 which extends through an opening in the plate 279. See Fig. 4. The pin 423, on pawl 419, is accessible through a door (not shown) and through which the printed record may be removed and the paper rolls supplied to the machine. The said door may be provided with a lock, the key of which is not available to the drivers of the cabs but may be in the possession of the inspector or auditor. When the pin 437 is elevated, the tooth 425 of the pawl 422 is placed out of the recess 426 in the ratchet 209, thus permitting the ratchet 209 to be rotated and the printing mechanism to be actuated.

In order to prevent the printing mechanism being actuated, at a time when neither the driver's nor the inspector's key 297 is in its printing position, the following device is provided. See Figs. 14 to 17 inclusive on Sheet 13. The pawl 422 is provided with an arm or projection 438 adapted to engage the projection 308 on lever 301. See Figs. 4 and 15. If the key 297 is not in a printing position, the projection 308 will be locked against the projection 438 by the pin 312, enlargement 315 and the member 310, thereby preventing the actuation of the pawl 422 either by the spring 421 or by the extension 435. If the key 297 is moved to its printing position, the pin 312 is elevated thereby, and the member 310 is unlocked. The projection 308 is also moved out of the path of the projection 438 by the projection 302 on the key; this permits the lever or projection 435 and the pawl 419 to be actuated.

*Means for driving the machine in the proper direction irrespective of the direction of travel of the vehicle.*—It will be remembered, that the fare counters are driven through the gear 37, which is adapted to be placed in mesh with a gear 39 in mesh with a gear 40 as hereinbefore stated. The gears 39 and 40, therefore, rotate in opposite directions. The gear 39 is driven from the shaft 41 through a ball ratchet 440 and a gear 441 in mesh with a worm gear 42 on the shaft 41. See Figs. 5 and 6. The gear 40 is driven from the shaft 41 through a ball ratchet 443 and a gear 444 in mesh with the worm gear 43 on the shaft 41. The worms 42 and 43 both have right hand threads, and the ratchets 440 and 443 are adapted to drive in opposite directions. For example, when shaft 41 is rotating in the direction of the arrow "A," the gear 441 will rotate in the direction of the arrow "B," and the ratchet 440 will drive the gear 39 in the same direction. When said shaft 41 is rotated in a direction opposite to that of the arrow "A," the gear 444 will be driven in the direction of the arrow "C" as will also the gear 40. Owing to the gear 39 and 40 being directly in mesh, gear 39 will be driven in the direction of the arrow "B" when the gear 444 is being driven in the direction of the arrow "C." When the gear 441 is driving the gear 39, the ratchet 443 will run idle, and when the gear 444 is driving the gear 39, the ratchet 440 will run idle. It will, therefore, be seen that the gear 39, from which the counting wheels are actuated, will rotate in the direction of the arrow "B" irrespective of the direction of rotation of the shaft 41. This mechanism therefore prevents the driver of the cab eliminating the registration of the fare by running the cab backward.

*Means for indicating when the machine has been obstructed by the printing mechanism.*—After the setting mechanism has been moved from its first to its second position, the printing mechanism may be actuated to take an impression. To indicate when the platens have been improperly manipulated or fraudulently placed in engagement with the type wheels to prevent, for example, the registration of a fare and the consequent non-rotation of the shaft 41, the following indicating counter and its actuating means is provided. The shaft 41 is driven from the short shaft 48 through upper and lower clutch members 44 and 45. The clutch member 45 is rigidly secured to the shaft 48, while member 44 is splined to the shaft 41 and is controlled by a spring 450 which normally holds the clutch members in engagement, as in Fig. 5. It will be seen, that, when the shaft 41 is obstructed, the rotation of the shaft 48 will reciprocate the clutch member 44. The teeth of the clutch members 44 and 45 are so proportioned that clutch member 44 will be reciprocated for each fractional portion of the distance the cab is driven with the shaft 41 obstructed. This fractional portion may, for convenience, be considered as a tenth of a mile. The reciprocation of clutch member 44 is registered as follows. Clutch member 44 is provided with a flange 451 engaged by one end of a lever 452 pivoted at 453 to the plate 1. See Fig. 12. The other end of said lever 452 is provided with a spring-controlled pawl 454 which engages a ratchet 455 on a counter 456. The ratchet 455 is provided with a retaining pawl 457, and said counter 456 is mounted on a bracket 458 attached to the plate 2. The reciprocation of the clutch member 44 will therefore actuate the counter 456. The counter 456 is viewable by the inspector or auditor through the door in the rear of the machine. See Fig. 2.

*Mode of operation.*—Before the cab, upon which the taximeter is placed, is turned over to the driver, the date wheels 97 and 98 are set and the inspector inserts his identification key in the housing 296. See Figs 4 and 15. When the key is thus inserted, the projection 302 thereon rocks the lever 301 and places the projection 308 out of the path of the projection 438. The lever 435 may then be elevated by the thumb piece 437 to disengage the tooth 425 from the ratchet 209. The lever 435, being actuated independently of the pawl 419, the printing mechanism may be actuated without moving the setting mechanism from its normal position, thereby eliminating the addition of the initial fare on the total cash fare counter, as is the case when the machine is operated by the driver of the cab. The inspector then actuates the printing mechanism by rotating the crank 207 and makes the first impression on the record as shown in Fig. 56. The cab being turned over to the driver, he will insert his identification key 297 in the housing 296, which operation will unlock the machine. The key 297 is shown in perspective in Fig. 55. The projection 302 of the key engages the end 301ª of the lever 301 and rocks the lever 304 thereby removing the upper end of said lever 304 out of the path of the shoulder 306 of the disk 307; the shaft 320 of the setting mechanism may then be actuated. When the cab is in motion, the mileage counter 128 will be driven from a wheel thereof through the gears 115 and 129ª, shaft 118, gears 126, 127, 40 and 39, and the shaft 41. See Figs. 5, 13 and 24.

When the cab is hired, the driver thereof depresses the flag crank 321 to the second or horizontal position. Fig. 5. This movement of said crank puts the machine in a condition to register and record the passenger's fare. In this operation of the flag crank 321, the shaft 320 of the setting mechanism is partially rotated and the following operations take place. As seen from Figs. 5 and 26, the cam 335 will permit the spring 388 to rock the lever 38 to place the gears 37 and 39 in mesh. The shaft 21, from which the counting wheels are driven, will then be rotated from the shaft 41 and the gear 39, through the gears 37, 36 and 35 and ratchet 33 mounted on the shaft 21. The said cam 335 engaging the upper end of the lever 389, thereby disengages the spring 393 from the balance wheel 394 of the clock 32 and permitting said clock to run. The shaft 21 is driven from the clock through the means shown in Figs. 1, 8, 33, 34 and 35. The clock is provided with gears 31 which drive the gear 29 which in turn drives the gear 28 on shaft 26 which shaft carries the bevel gear 25 in mesh with the bevel gear 22 freely mounted on the said shaft 21. The shaft 21 is driven from this gear 22 through the resilient pawl 24 and a ratchet 23. When the vehicle is at rest or is running under a predetermined speed, the said shaft 21 is driven from the clock; but when said vehicle is running over a given speed, the shaft 21 will be driven from the vehicle propelled shaft 41. Also, when said flag crank 321 is moved to its second position, the cam 340, (shown in Fig. 44) releases the arm 18, and the frame 14 and the pawls 146, 61, 63, 52, 54 and 13 are thus permitted to be placed in operative relation with the ratchets of their respective counting wheels. At the same time the latch 65 is placed in engagement with the drum 66 on the shaft 21. When the shaft 21 is then rotated and the recess 67 in the drum receives the latch 65, the spring 16 will depress the frame 14 and the pawls carried thereby, and the counters will be operated. During the continued movement of the shaft 21, the cams 20 will engage the projection 19 of the arm 18 and will actuate the frame 14 and consequently impart subsequent movement to the counters.

When the flag crank 321 is moved to its second position, the cam projection 336 releases the lever 120 and thus permits the spring 122 to rock said lever to set the clutch 119, as will be seen from Figs. 1 and 24. When the clutch 119 is set, the mileage counter 110 will be driven from the shaft 41. In said movement of the flag crank to its second position, the cams 186 and 190 will move the pawls 176 and 177 out of the path of the resetting cams 175 thereby permitting the counting wheels to freely rotate, as will be seen from Figs. 45 and 46. In said movement of the crank shaft to its second position, the initial fare is added to the total fare printing counter 139. See Figs. 1, 13 and 36 to 42. When the setting shaft 320 and the disk 365 and pawl 363 carried thereby are rotated, the said pawl 363 will rotate the ratchet 362 until said pawl is disengaged from said ratchet by the cam 372. During the rotation of the ratchet 362, the "unit" wheel 140 of the counter 139 is rotated through the gears 361, 360, 144, 143 and 142. Also, when the flag crank 321 is placed in its second position, the cam 343 will elevate the blind 344, thereby disclosing the initial fare on the indicating wheel 10 as is shown in Figs. 1 and 30. Also, when the flag crank 321 is placed in its second position, the pinion 349 will elevate the indicator 350 to a position to indicate that the vehicle is hired, and that the machine is in a condition to record the fare. Also, when the flag crank 321 is placed in its second position, the pin 353 will release the frame 72, which operation places the pawls 71 and 171 in operative relation with the supplemental counters. See Figs. 1, 3, 9 and 10. These counters may be actuated at any time during the period in which the vehicle is in hire. The said counters are actuated by rotating the cam 79 by thumb pieces (not shown). When the cam 79 is rotated, the said cam engages one arm 76 of a lever pivoted at 77 and the other arm 75 of which engages a projection 74 on the shaft 73, thereby rocking the shaft 73 and the frame 72, and permitting the pawls 71 and 171 to actuate the supplemental counters under the influence of spring 82. Also, when the flag crank 321 is moved to its second position, the rotation of the disk 355 permits the spring 421 to place the pawl 419 in the path of the shoulder 417, thereby preventing the flag crank and the setting mechanism being returned to their first position without actuating the printing mechanism.

The flag crank 321 is maintained in its second position while the vehicle is normally in hire, but if it is necessary for the driver to make repairs to the cab and thus interrupt the hire or the service, the driver lowers the flag crank 321 to its third or lower vertical position. When the said flag crank 321 is moved to its third position, a cam 242 shifts the lever 28 on its pivot 30 and places the gears 137 and 136 in mesh. See Figs. 1, 13 and 33. The non-recording time counter 129 will then be actuated from the gear 136 by the gears 134, 135 and 132 and will record the minutes of time the cab is out of use. Also, when the flag crank 321 is moved to its third position, the pinion 349 will shift the indicator 350 to a position to indicate the word "Stopped" thus informing the passenger that the machine is not registering or recording a fare. When the driver has finished the repairs, he returns the flag crank 321 to its second position and this places the machine in the same condition as when the flag crank was moved to its second position from its first position. The time consumed in making repairs is accounted for and is not included in the fare paid by the passenger.

When the passenger discharges the cab, the driver actuates the printing mechanism by rotating the crank 207 and thereby the shaft 203. During the initial movement of the shaft 203, the inking rollers 215 and 216 will be actuated. See Figs. 7, 9, 11 and 29. During this operation, the cam 226 will rock the shaft 224 thereby oscillating the segment gears 223, and elevating the frames 220ª and 230, the carriers 218 and 228 and the inking rollers 215 and 216 carried thereby. As shown in Figs. 7, 10 and 12, the continued movement of the shaft 203 will actuate the frames 197 and 198 and move the platens 195 and 196 in engagement with the type wheels thereby pressing the paper strips 263 and 247 against their respective type wheels and securing an impression. After the impression has been secured, the paper webs are fed. See Figs. 4 and 7. During this operation, the tooth 241 of disk 240 (Fig. 19) will engage the Swiss gear 242 and will cause a partial rotation of the shaft 243 and the feeding rolls 244 and 245 between which the record strip 247 passes. The feeding rolls 260 and 261 between which the ticket strip 263 passes, are actuated by rotating the shaft 259. The gear 268 on the shaft 259 is rotated from the shaft 203 through gears 258, 25., 255 and a mutilated gear 254 shown in Fig. 19. Near the end of the movement of the shaft 203, the one tooth gear 211 will engage the gear 212 and will actuate the consecutive counter 100 through the gears 213 and 102 and the shaft 101. See Figs. 9 and 13. At the end of the movement of the printing mechanism (see Figs. 4 and 20), the pin 431, carried by the disk 240, will engage the catch 428 and shift the pawl 419 to a position to permit the cam surface 418 to engage the cam surface 420, thereby permitting the shaft 320 and the flag crank 321 to be returned to its first or normal position. When the flag crank 321 is returned to such position, the movement of the pawl 419 will place the tooth 425 in engagement with the recess 426 in the ratchet 209, thereby locking the printing mechanism.

When the flag crank 321 is returned to its first position, the following operations take place. As shown in Figs. 5 and 26, the cam 335 will release the lever 389 and thus permit the spring 395 to move the spring 393 in engagement with the balance wheel 394 to stop the clock. The cam 335 will also engage the lever 38 to disengage the gears 37 and 39 and thereby prevent the shaft 21, from which the counters are actuated, being driven from the shaft 41 and the wheels of the vehicle. As shown in Figs. 1 and 24, the cam 336 will engage the upper end of the lever 120 which operation will disengage the clutch 119. As shown in Fig. 44, the cam 340 will engage the pin 341 on the arm 18 thereby elevating the frame 14 and the pawls carried thereby and permitting the counters to easily rotate to a normal position. As shown in Figs. 45 and 46, the pin 193 will engage the latch 187 which releases the arm 185 thereby permitting the pawls 176 to engage the cams 175 to initially rotate the counting wheels and the shaft 21 to a normal position. The pin 191 will then release the arm 189 and permit the pawls 177 to engage the cams 175 to complete the returning movement of the counting wheels and the shaft 21.

As shown in Fig. 9, the pin 353 will engage the frame 72, thereby disengaging the pawls 71 and 171 from their respective ratchets and permitting the counting wheels to be returned to zero. When the shaft 320 and the flag crank 321 have been returned to the first position, the cab is for hire and ready to receive another passenger. The indicator so indicates.

It will be understood that various structural changes or modifications may be made without affecting the laws of operation of the several groups of mechanisms. These are described with considerable minuteness, not however, with a view to emphasizing the importance of structural features in all cases, but more through a purpose to make clear the mode of operation of the several groups of mechanisms, and the functions of each. We, therefore, do not wish to restrict ourselves to details of construction but desire to bring within the scope of our claims whatever structural changes that may be made without departing from the spirit of our invention.

We claim—

1. In a taximeter, a counter, an actuator for said counter, an arm on said actuator, a lever adapted to engage said arm, a cam adapted to rock said lever to actuate said counter, and a ratchet controlling the movement of said cam.

2. In a taximeter, a counter, an actuator for said counter, a spring controlling said actuator, a cam adapted to move said actuator and to release said actuator to permit said spring to actuate said counter, and a ratchet controlling the movement of said cam.

3. In a taximeter, a counter, an actuator for said counter, a spring controlling said actuator, a lever in operative relation with said actuator, a cam adapted to rock said lever to shift and to release said actuator and to thereby permit said spring to actuate said counter, and a ratchet controlling the movement of said cam.

4. In a taximeter, a plurality of banks of printing counters, an inking member for each bank of counters, one of said inking members being mounted on and secured to the other of said inking members, and a common actuator for all of said inking members said common actuator being adapted to move one of said inking members a greater extent than another.

5. In a taximeter, a plurality of banks of printing members, an inking member for each bank of printing members, one of said inking members being mounted on and secured to the other of said inking members, and a common actuator for all of said inking members and having a differential movement, said common actuator being adapted to move one of said inking members a greater extent than another.

6. In a taximeter, a plurality of banks of printing members, an inking member for each bank of printing members, one of said inking members being mounted on and secured to the other of said inking members, an actuator for one bank of said printing members, an actuator for the other bank of said printing members, said last named actuator being adapted to move said first named actuator and having a greater extent of movement than said first named actuator, and operating means for said last named actuator.

7. In a taximeter, a plurality of banks of printing counters, an inking device for each bank of printing counters, an actuator for each of said inking devices, one of said actuators being provided with elongated recesses which receives the other actuator, whereby one of said actuators has a greater extent of travel than the other, and means for operating said actuators.

8. In a taximeter, a plurality of banks of printing counters, an inking member for each bank of printing counters, an actuator for each of said inking members, one of said actuators being provided with elongated recesses adapted to receive the other of said actuators, whereby one of said actuators has a greater extent of travel than the other, a rack mounted on one of said actuators, a segment gear in engagement with said rack, and means for operating said segment gear.

9. In a taximeter, an upper and a lower bank of printing counters, an inking member for each bank of printing counters, carriers upon which said inking members are mounted, actuators for said inking member of the upper bank of printing counters and to which the carriers thereof are pivoted, actuators for the inking member of the lower bank of printing counters and to which the carriers thereof are pivoted, said last named actuators being provided with elongated recesses which receive said first named actuators whereby said first named actuators have a greater extent of travel than the last named actuators, racks carried by said actuators, gears in mesh with said racks, and means for operating said gears.

10. In a taximeter, an upper and a lower bank of printing counters, an inking member for each bank of printing counters, carriers upon which said inking members are mounted, actuators to which said carriers are pivoted, racks carried by said actuators, gears in mesh with said racks, and means for operating said gears.

11. In a taximeter, shafts adapted to receive a paper strip, one of said shafts being mounted on eccentric pivots, and means for rocking said shaft on its eccentric pivots to permit the strip of paper to be inserted between said shafts.

12. In a taximeter, shafts adapted to receive a paper strip, one of said shafts being mounted on eccentric pivots, a pinion mounted on one of said pivots, and a rack in mesh with said pinion and adapted to separate said shafts to permit of the insertion of said paper strip.

13. In a taximeter, feeding rolls adapted to receive a paper strip, shafts upon which said rolls are mounted, one of said shafts being provided with eccentric pivots, a pinion mounted on one of said pivots, a rack in mesh with said pinion, and a cam adapted to engage said rack to rock one of said shafts on its eccentric pivots to permit of the insertion of said paper strip.

14. In a taximeter, an unlocking member, a key having a projection and a cam surface thereon, said projection being adapted to actuate said unlocking member, and a pin actuated by said cam surface and adapted to release said unlocking member to enable the key to actuate said unlocking member.

15. In a taximeter, an unlocking member, a sliding member attached to said unlocking member, a key having a projection and a cam surface thereon, said projection being adapted to actuate said unlocking member, a pin having an enlargement thereon, actuated by said cam and adapted to release said sliding member and said unlocking member.

16. In a taximeter, an unlocking lever, a sliding member provided with a shoulder and pivoted to said lever, a key having a projection and a cam surface thereon, said projection being adapted to engage and actuate said lever, and a pin having an enlargement thereon, adapted to engage said shoulder, said pin adapted to be actuated by said cam to release said lever.

17. In a taximeter, a lever forming an unlocking member, a sliding member provided with an elongated recess, a shoulder pivoted to said unlocking lever, a key having a projection and a cam surface thereon, said projection being adapted to engage and actuate said lever, and a spring-controlled pin extending through said elongated recess and provided with an enlargement adapted to engage said shoulder and adapted to be engaged by said cam to release said lever.

18. In a taximeter, a counter, adjustable means for adding an initial fare on said counter, means for adding subsequent fares on said counter, and setting mechanism controlling the operative relation between said counter and the means for adding the subsequent fares, said setting means also controlling said initial fare adding means.

19. In a taximeter, a counter, means for adding an initial fare on said counter, means for adding subsequent fares on said counter, setting mechanism controlling the operative relation between said counter and its subsequent actuating mechanism, said setting means also controlling said initial fare actuating means, and means actuated by said setting means and adapted to prevent said counter being overthrown by said initial fare actuating means.

20. In a taximeter, a counter, means for adding an initial fare value on said counter, means for adding subsequent fare values on said counter, means for preventing said counter being overthrown by said initial fare adding means, and means for actuating said initial fare adding means and for controlling said subsequent fare adding means and said overthrow preventative means.

21. In a taximeter, a counter, means for adding an initial fare value on said counter, and means for intermittently adding subsequent uniform fare values on said counter.

22. In a taximeter, a counter, adjustable means for adding an initial fare value on said counter, and means for adding subsequent fare values on said counter.

23. In a taximeter, a counter, adjustable means for adding an initial fare value on said counter, and means for adding uniform subsequent fare values on said counter.

24. In a taximeter, a counter, means for adding an initial fare value on said counter, means for adding subsequent fare values on said counter, setting means adapted to actuate said initial fare adding means and to place said counter in operative relation with its subsequent actuating means, and overthrow-preventing means for said counter controlled by said setting means and by said subsequent counter-actuating means.

25. In a taximeter, a counter, means for adding an initial fare value on said counter, means for adding subsequent fare values on said counter, means for actuating said initial fare adding means, and overthrow-preventing means for said counter controlled by said actuating means for the initial fare adding means and the subsequent actuating means for the counter.

26. In a taximeter, a counter, overthrow-preventing means for said counter, means for adding an initial fare value on said counter, actuating means for said initial fare adding means, said actuating means being adapted to set said overthrow-preventing means, and means for adding subsequent fare values to said counter, said last named means being adapted to release said overthrow-preventing means.

27. In a taximeter, a counter, overthrow-preventative means for said counter, means for adding an initial fare value on said counter, actuating means for said initial fare adding means, said actuating means being adapted to set said overthrow-preventative means, means for adding subsequent fare values to said counter and adapted to release said overthrow-preventative means, the means for adding the subsequent fare values being under the control of the actuating means for the initial fare adding means.

28. In a taximeter, a counter, an actuator for said counter, means for disengaging said actuator from said counter before said actuator has reached the end of its operating movement, and means controlled by said actuator and adapted to stop said counter when said counter is moved said predetermined distance.

29. In a taximeter, a counter, an actuator for said counter, adjustable means for disengaging said actuator from said counter before said actuator has reached the end of its operating movement, and means controlled by said actuator and adapted to stop said actuator when said counter is moved said predetermined distance.

30. In a taximeter, a counter, an actuator for said counter, means for shifting said actuator, means for disengaging said actuator from said counter when moved a predetermined distance, and means for holding said actuator in an elevated position when said actuator is being returned to a normal position.

31. In a taximeter, a counter, an actuator for said counter, means for shifting said actuator, means for disengaging said actuator from said counter before said actuator has reached the end of its operating movement, and a resilient member adapted to hold said actuator in an elevated position when said actuator is being returned to a normal position.

32. In a taximeter, a counter, an actuator for said counter, means for shifting said actuator, means for disengaging said actuator from said counter before said actuator has reached the end of its operating movement, and a resiliently mounted cam adapted to hold said actuator in an elevated position when said actuator is being returned to a normal position.

33. In a taximeter, a counter, an actuator for said counter, means for shifting said actuator, means for disengaging said actuator from said counter before said actuator has reached the end of its operating movement, and a laterally movable resiliently mounted cam adapted to hold said actuator in an elevated position when the same is being returned to a normal position.

34. In a taximeter, a counter, a ratchet connected to said counter, a pawl in operative relation with said ratchet and adapted to actuate said counter, means for reciprocating said pawl, a cam adapted to disengage said pawl from said ratchet before said actuator has reached the end of its operating movement, and a resiliently mounted cam adapted to hold said actuator in an elevated position when it is being returned to a normal position.

35. In a taximeter, a counter, a ratchet connected thereto, a pawl in operative relation with said ratchet and provided with a pin, means for actuating said pawl to actuate said counter, a cam adapted to be engaged by said pin to disengage said pawl from said ratchet before said actuator has reached the end of its operating movement, and a resiliently mounted concentric cam adapted to move laterally and to be engaged by said pin to hold said pawl out of engagement with said ratchet when said pawl is being returned to its normal position.

36. In a taximeter, a counter, a ratchet connected to said counter, a pawl provided with a pin, in operative relation with said ratchet, a disk upon which said pawl is mounted, a shaft adapted to actuate said disk, a cam adapted to be engaged by said pin to disengage said pawl from said ratchet when the counter has been moved a predetermined distance, an arm carried by said shaft, a spring carried by said arm, and a concentric cam mounted on spring and adapted to be engaged by said pin to hold said pawl out of engagement with said ratchet when said pawl is being returned to a normal position.

37. In a taximeter, a counter, a ratchet connected to said counter, a pawl, provided with a pin, in operative relation with said ratchet, a disk upon which said pawl is mounted, a shaft adapted to actuate said disk, an adjustable cam adapted to be engaged by said pin to disengage said pawl from said ratchet when the counter has been moved a predetermined distance, an arm provided with a pin and carried by said shaft, said pin being adapted to hold said cam in a set position, a spring carried by said arm, and a concentric cam mounted on said spring and adapted to be engaged by said pin to hold said pawl out of engagement with said ratchet when said pawl is being returned to a normal position.

38. In a taximeter, a counter, means for adding an initial fare on said counter, means for adding a subsequent fare on said counter, a pawl in operative relation with said counter and adapted to prevent the same being overthrown, a lever actuated by said initial adding means and adapted to set said pawl, and means carried by said subsequent actuating means and adapted to release said pawl.

39. In a taximeter, a counter, means for adding an initial fare value on said counter, means for adding a subsequent fare value on said counter, a spring-controlled pawl in operative relation with said counter and adapted to prevent the same being overthrown, a lever actuated by said initial adding means and adapted to set said pawl, and means carried by said subsequent actuating means and adapted to release said pawl.

40. In a taximeter, a counter, means for adding an initial fare value on said counter, means for adding a subsequent fare value on said counter, a spring-controlled pawl in operative relation with said counter and adapted to prevent the same being overthrown, a lever actuated by said initial fare adding means and adapted to set said pawl, and a swinging member carried by said subsequent actuating means and adapted to release said pawl.

41. In a taximeter, a counter, overthrow-preventative means for said counter, and adding means for said counter adapted to set and release said overthrow preventative means.

42. In a taximeter, a counter, overthrow-preventative means for said counter, means for adding an initial fare value to said counters and for setting said overthrow-preventative means, and means for adding subsequent fare values to said counter said last named means adapted to release said overthrow-preventative means, and said subsequent adding means being under the control of the initial fare adding means, whereby said initial adding means sets and releases said overthrow-preventative means.

43. In a taximeter, a counter, a pawl in operative relation with said counter and adapted to prevent the same being overthrown, means for adding an initial fare value on said counter, said means being also adapted to actuate said pawl to prevent the counter being overthrown, means for adding a subsequent fare value on said counter, said means being in operative relation with said pawl and under the control of said initial fare adding means, whereby said initial fare adding means also is adapted to release said pawl through the operation of said subsequent adding means.

44. In a taximeter, a counter, a pawl in operative relation with said counter, means for adding an initial fare value on said counter, said means being also adapted to actuate said pawl to prevent the counter being overthrown, means for adding a subsequent fare value on said counter, a swinging member mounted on said subsequent adding means and in operative relation with said pawl, said subsequent fare adding means being under the control of said initial adding means, whereby said initial adding means is also adapted to release said pawl, through the operation of the subsequent adding means.

45. In a taximeter, a counter, a pawl in operative relation with said counter and adapted to prevent the same being overthrown, means for adding an initial fare value on said counter, a lever controlled by said initial fare adding means and adapted to actuate said pawl to prevent the counter being overthrown, means for adding a subsequent fare value on said counter, a swinging member mounted on said subsequent adding means and in operative relation with said pawl, said subsequent fare adding means being under the control of said initial adding means, whereby said initial adding means is also adapted to release said pawl.

46. In a taximeter, printing mechanism, setting mechanism, and locking means normally adapted to lock said setting mechanism and unlock said printing mechanism when said setting mechanism is actuated, said locking means being also adapted to be actuated independently of the setting mechanism to unlock said printing mechanism.

47. In a taximeter, printing mechanism, setting mechanism, and locking means normally adapted to unlock said printing mechanism when said setting mechanism is actuated, said locking means being also adapted to be actuated independently of the setting mechanism to unlock said printing mechanism.

48. In a taximeter, printing mechanism, setting mechanism, locking means normally adapted to unlock said printing mechanism when said setting mechanism is actuated, said locking means being also adapted to be actuated independently of the setting mechanism to unlock said printing mechanism, and a key controlling said locking means.

49. In a taximeter, printing mechanism, setting mechanism, locking means normally adapted to unlock said printing mechanism when said setting mechanism is actuated, said locking means being also adapted to be actuated independently of the setting mechanism to unlock the printing mechanism, and a key controlling said locking means and said setting means.

50. In a taximeter, printing mechanism, setting mechanism, and interlocking means normally adapted to be actuated by said printing and setting mechanisms, said interlocking means being also adapted to unlock the printing mechanism independently of the setting mechanism.

51. In a taximeter, printing mechanism, setting mechanism, interlocking means normally adapted to be actuated by said printing and setting mechanisms, said interlocking means being also adapted to unlock the printing mechanism independent of the setting mechanism, and a key controlling said interlocking mechanism.

52. In a taximeter, printing mechanism, setting mechanism, interlocking means normally adapted to be actuated by said printing and setting mechanisms, said interlocking means being also adapted to unlock the printing mechanism independently of the setting mechanism, and a key controlling said setting and interlocking mechanisms.

53. In a taximeter, printing mechanism, setting mechanism, and pawls normally adapted to unlock said printing mechanism when said setting mechanism is actuated, one of said pawls being adapted to be actuated independently of the setting mechanism to unlock said printing mechanism.

54. In a taximeter, printing mechanism, setting mechanism, and resiliently connected pawls normally adapted to unlock said printing mechanism when said setting mechanism is actuated, one of said pawls being also adapted to be actuated independently of the setting mechanism to unlock said printing mechanism.

55. In a taximeter, printing mechanism, setting mechanism, and pawls mounted on a common pivot and resiliently connected, said pawls being normally adapted to unlock said printing mechanism when said setting mechanism is actuated, and one of said pawls being adapted to be actuated independently of the setting mechanism to unlock said printing mechanism.

56. In a taximeter, printing mechanism, setting mechanism, a pawl controlled by said setting mechanism, a pawl connected to said first named pawl and adapted to lock said printing mechanism, and a spring connecting said pawls, the pawl controlled by the setting mechanism being adapted to be actuated independently of the pawl connected thereto to unlock said printing mechanism.

57. In a taximeter, printing mechanism, setting mechanism, a pawl controlled by said setting mechanism and having a pin thereon, a second pawl adapted to lock said printing mechanism and in engagement with said pin, and a spring connecting said pawls, whereby said second pawl may be actuated independently of the first named pawl to unlock said printing mechanism.

58. In a taximeter, printing mechanism, setting mechanism, and means mounted between said printing and setting mechanisms and normally adapted to unlock one when the other is actuated, said means being also adapted to be actuated to unlock the printing mechanism without actuating the setting mechanism.

59. In a taximeter, printing mechanism, setting mechanism, and pawls mounted between said printing and setting mechanisms and normally adapted to unlock one when the other is actuated, said pawls being also adapted to be actuated to unlock the printing mechanism without actuating the setting mechanism.

60. In a taximeter, printing mechanism, setting mechanism, a first pawl adapted to lock said printing mechanism, a second pawl actuated by and adapted to lock said setting mechanism, said second pawl being also adapted to be actuated by said printing mechanism to unlock the setting mechanism, said first named pawl being resiliently connected to said second named pawl, and adapted to be actuated thereby, and said first named pawl being also adapted to be actuated independently of the second pawl to unlock the printing mechanism.

61. In a taximeter, printing mechanism, setting mechanism, a pawl adapted to lock said printing mechanism, a pawl actuated by and adapted to lock said setting mechanism, a latch mounted on the pawl of the setting mechanism, and adapted to be engaged by said printing mechanism to unlock the setting mechanism, the pawl of the printing mechanism being resiliently connected to the pawl of the setting mechanism and adapted to be actuated by the pawl of the setting mechanism, and to be actuated independently thereof to unlock the printing mechanism.

62. In a taximeter, printing mechanism, setting mechanism, a pawl adapted to lock said printing mechanism, a pawl actuated by and adapted to lock said setting mechanism, a latch mounted on said last named pawl and adapted to be engaged by said printing mechanism to unlock the setting mechanism, said last named pawl being provided with a stop normally in engagement with said first named pawl, and a spring connecting said pawls, whereby said printing mechanism is normally unlocked by said setting mechanism and is also unlocked by the independent operation of the first named pawl.

63. In a taximeter, a counter, means for adding an initial fare value on said counter, means for adding a subsequent fare value on said counter, said last named means being controlled by said initial adding means, printing mechanism for said counter, and interlocking means mounted between said initial adding means and said printing mechanism and adapted to normally permit said initial adding means and said printing mechanism to be actuated consecutively, said interlocking means being provided with an independently movable portion in operative relation with said printing mechanism, whereby said printing mechanism may be actuated without adding an initial fare value on said counter.

64. In a taximeter, a counter, means for actuating said counter to add an initial fare value thereon, means for actuating said counter to add a subsequent fare value thereon, printing mechanism for said counter, and interlocking means interposed between said initial fare-adding means and said printing mechanism, and adapted to normally permit said initial fare adding means and said printing mechanism to be actuated consecutively, said interlocking means being also adapted to permit the printing mechanism to be actuated independently of the initial fare adding means.

65. In a taximeter, driving means, a counter normally movable with and actuated by said driving means, and means for indicating differential movements between said counter and said driving means.

66. In a taximeter, driving means, a counter normally movable with and actuated by said driving means, and means for indicating and registering the differential movements between said counter and said driving means.

67. In a taximeter, driving means, a counter, resilient means normally connecting said driving means and said counter, and means for indicating the differential movements between said driving means and counter.

68. In a taximeter, driving means, a counter, a clutch normally connecting said driving means and said counter, and means connected to said clutch and adapted to indicate the differential movements between said driving means and said counter.

69. In a taximeter, driving means, a counter, a spring-controlled clutch normally connecting said driving means and said counter, and means connected to said clutch and adapted to indicate the differential movements between said driving means and said counter.

70. In a taximeter, driving means, a counter, a clutch normally connecting said driving means and said counter, and another counter connected to one member of said clutch and adapted to indicate the differential movements between said driving means and said last named counter.

71. In a taximeter, driving means, a counter, a clutch normally connecting said driving means and said counter, a lever connected to one member of said clutch, and a second counter connected to said lever and adapted to indicate the differential movements between said driving means and said second counter.

72. In a taximeter, driving means, a counter, a spring-controlled clutch connecting said driving means and said counter, one member of said clutch having a flange thereon, a lever in engagement with said flange, and a second counter connected to said lever and adapted to indicate the differential movement between the clutch members.

73. In a taximeter, a counter, printing mechanism for said counter, driving mechanism for said counter, and means in operative relation with said driving means and adapted to indicate when said counter is obstructed by said printing mechanism.

74. In a taximeter, a counter, driving mechanism for said counter, and means in operative relation with said driving means and adapted to indicate when said counter is obstructed.

75. In a taximeter, two clutch members normally movable in unison, and an indicator connected to one of said clutch members and adapted to be actuated by one of said clutch members during the relative movement between said clutch members.

76. In a taximeter, two clutch members normally movable in unison, one of said members being spring-controlled, and a counter connected to said spring-controlled clutch member and adapted to be actuated by one of said clutch members during the relative movement between said clutch members.

77. In a taximeter, two shafts mounted in axial alinement, a clutch member rigidly mounted on one of said shafts, a second clutch member splined to the other shaft, and an indicator connected to said splined member and adapted to be actuated by one of said clutch members during the relative movement between said clutch members.

78. In a taximeter, two shafts mounted in axial alinement, a clutch member rigidly mounted on one of said shafts, a second clutch member splined to the other shaft, a spring controlling said splined clutch member, and an indicator connected to said splined clutch member and adapted to be actuated by one of said clutch members during the relative movement between said clutch members.

79. In a taximeter, two shafts mounted in axial alinement, a clutch member rigidly mounted on one of said shafts, a second clutch member splined to the other shaft, a spring controlling said splined clutch member, and a counter connected to said splined clutch member and adapted to be actuated by one of said clutch members during the relative movement between said clutch members.

80. In a taximeter, two shafts mounted in axial alinement, a clutch member rigidly mounted on one of said shafts, a second clutch member splined to the other shaft, a spring controlling said splined clutch member, a lever connected to said splined clutch member, and a counter actuated by said lever and adapted to be actuated by one of said clutch members during the relative movement between said clutch members.

81. In a taximeter, two shafts mounted in axial alinement, a clutch member rigidly mounted on one of said shafts, a second clutch member provided with a flange splined to the other shaft, a spring controlling said splined clutch member, a lever in engagement with said flange, and a counter actuated by said lever and adapted to be actuated by one of said clutch members during the relative movement between said clutch members.

82. In a taximeter, a counter, a second counter, a clock, means including a shiftable lever having gears thereon connecting said counters and clock, resilient members mounted on said lever, a cam in engagement with said resilient members, and setting means controlling said cams.

83. In a taximeter, a counter, a second counter, a bevel gear connected with each counter, bevel gears adapted to be placed in mesh with said first named bevel gears, a lever upon which said second named bevel gears are mounted, a clock connected with second gears, resilient members mounted on said lever, a cam in engagement with said resilient members, and setting means controlling said cam.

84. In a taximeter, a fare counter, a time counter, a mileage counter, individual actuating mechanisms for said counters, and setting mechanism which, when in its first position is adapted to hold all of said actuating mechanisms out of operative relation with said counters and which, when in a second position, is adapted to place said fare and mileage counters in operative relation with their actuating mechanism, and which, when in a third position, is adapted to place said time counter in operative relation with its actuating mechanism.

85. In a taximeter, a fare counter, a mileage counter, a time counter, printing mechanism for said counters, and an actuator for said fare counter controlling said mileage counter, said time counter and said printing mechanism.

86. In a taximeter, a fare counter, a mileage counter, a time counter, a printing mechanism for said counters, and an actuator for said fare counter controlling said mileage counter, said time counter and said printing mechanism, said actuator being controlled by said printing mechanism.

87. In a taximeter, a fare counter, a mileage counter, a time counter, printing mechanism for said counters, an actuator for said fare counter controlling said mileage counter, said time counter and said printing mechanism, and a lock controlling said actuator.

88. In a taximeter, a fare counter, a mileage counter, a time counter, printing mechanism for said counters, an actuator for said fare counter controlling said mileage counter, said time counter and said printing mechanism, and a lock controlling said actuator and said printing mechanism.

89. In a taximeter, a fare counter, a mileage fare counter controlling said mileage counter, said time counter and said printing mechanism, said actuator being controlled by said printing mechanism, and a lock controlling said actuator and said printing mechanism.

90. In a taximeter, a counter, a first and a second actuator for said counter, said second actuator being under the control of said first actuator, whereby said actuators are consecutively operated.

91. In a taximeter, a counter, a first and a second actuator for said counter, and overthrow preventative means for said counter, said overthrow preventative means being adapted to be actuated by said first actuator previous to the operation of the second actuator.

92. In a taximeter, a counter, a first and a second actuator for said counter, and overthrow preventative means for said counter under the control of the first actuator.

93. In a taximeter, a counter, a first and a second actuator for said counter, and resetting means for said counter controlled by said first actuator.

94. In a taximeter, a counter, a first and a second actuator for said counter, resetting means for said counter controlled by said first actuator, and overthrow preventative means for said counter also controlled by said first actuator.

95. In a taximeter, a counter, printing mechanism for said counter, an initial and a subsequent actuating means for said counter, said initial actuating means controlling said subsequent actuating means and said printing mechanism.

96. In a taximeter, a fare counter, a time counter, printing mechanism for said counters, an actuator for said time counter, and an actuator for said fare counter controlling said time counter and said printing mechanism.

97. In a taximeter, a fare counter, a time counter, an initial and a subsequent actuating means for said fare counter, an actuating means for the time counter, and means adapted to primarily actuate said initial actuating means and to secondarily control said subsequent actuating means for the fare counter and the actuating means for the time counter.

98. In a taximeter, a fare counter, a total fare counter, a time counter, printing mechanism for said counters, initial fare adding means for said fare and total counters, a subsequent fare adding means for said fare and total counters under the control of said initial fare adding means, resetting means for said fare counter, and said initial fare adding means controlling said time counter and said printing mechanism.

99. In a counter, a counting wheel, a ratchet having a blank space thereon, and a pawl adapted to engage said ratchet to rotate said counter and to engage said blank space to prevent the counter being over-run.

100. In a counter, a counting wheel having indications therein, a ratchet having a blank space thereon adjacent to the zero indication on the wheel, and a pawl adapted to engage said ratchet to rotate said counter and to engage said blank space to prevent the counter being over-run.

101. In a counter, a counting wheel, means for rotating said wheel, and a ratchet carried by said wheel and in operative relation with said ratchet and provided with means adapted to be engaged by said pawl to prevent the counter being over-run.

102. In combination in a taximeter, a member, actuating means for said member, means to lock said member against actuation, and means moving at a predetermined rate, for causing, after a predetermined amount of movement, the release of said locking means and the actuation of said actuating means.

103. In combination in a taximeter, a counter, means for actuating said counter, disengaging means for rendering said actuating means inoperative, and holding means adapted to maintain said actuating means inoperative during the forward movement thereof and coöperating with said actuating means during the return movement thereof to render said actuating means inoperative.

104. In combination in a taximeter, a counter, means for initially moving said counter a predetermined amount, means controlled by said initially moving means for locking said counter at the end of said initial movement, means moving at a predetermined rate for subsequently actuating said counter, and means controlled by said means moving at a predetermined rate for releasing said locking means and permitting the actuation of said counter.

105. In combination in a taximeter, a counter, means for actuating said counter, means for locking said counter against actuation, and means moving at a predetermined rate controlling said actuating means and causing the release of said locking means, after a predetermined amount of movement, to permit the actuation of said counter.

106. In combination in a taximeter, a counter, means for actuating said counter, means to lock said actuating means against actuation and means moving at a predetermined rate which cause the release of said locking means and the operation of said actuating means.

107. In combination in a taximeter, a counter, means for initially moving said counter a predetermined amount, means for subsequently moving said counter at a predetermined rate, and means for varying the initial amount of movement.

108. In combination in a taximeter, a counter, operating means for said counter, means disconnecting said operating means from said counter, after a predetermined amount of movement of said counter, and means for varying said predetermined amount of movement.

109. In combination in a taximeter, a counter, means for moving said counter initially a predetermined amount, means for locking said counter from movement after said initial movement, means for subsequently actuating said counter and means for releasing said locking means after a predetermined amount of movement of said means for subsequently actuating said counter and permitting the actuation of said counter by said means for subsequently actuating said counter.

110. In combination in a taximeter, a counter, time controlled means for driving said counter, distance controlled means for driving said counter, a second counter, means for disconnecting the time controlled driving means from the first counter and connecting it to the second counter, whereby when the second counter is actuated by said time controlled driving means, said first counter can be actuated by said distance controlled driving means.

111. In combination in a taximeter, a counter, means for actuating said counter including an oscillating shaft, and means for oscillating said shaft to actuate said counter comprising a rotatably mounted cam on the said shaft, a second cam rigidly mounted on said shaft and means mounted adjacent to said shaft adapted to be engaged by said cam rotatable on said shaft and to engage said cam rigidly mounted on said shaft whereby, on the rotation of said rotatably mounted cam, said shaft is oscillated to operate said counter.

112. In combination in a taximeter, a counter, means for actuating said counter, means for disconnecting said counter from its actuating means and means controlled by said disconnecting means for locking said counter against movement while disconnected from its actuating means.

113. In combination in a taximeter, a plurality of printing counters, a plurality of inking devices for said counters, a plurality of sliding carriages on which said inking devices are mounted, one of said carriages being mounted on and carried by the other carriage and means for moving one carriage by the other during, and only during, a part of its movement whereby said inking devices are moved differential distances during their inking operation.

114. In combination in a taximeter, a plurality of printing counters, a plurality of impression devices for said counters, a plurality of inking devices for said counters, a single operating device and means controlled thereby for positively moving said inking devices to ink said counters and to move said impression devices to take an impression from said counters in a single operation.

115. In combination in a taximeter, a printing counter, means for actuating said counter, means for taking an impression from said counter and means controlled by said impression means for holding said counter actuating mechanism out of operative relation with said counter.

116. In combination in a taximeter, a printing counter, means for taking an impression from said counter, means controlled by said impression means for preventing the actuation of said printing counter and means preventing the operation of said last named means until after a predetermined amount of movement of said counter actuating means.

117. In combination in a taximeter, a printing counter, means for actuating said printing counter, means for taking an impression from said printing counter, means controlled by said impression means for holding said printing counter actuating means out of operative relation with said printing counter and means for resetting said printing counter to an initial position, said last mentioned means also releasing said printing counter actuating means from said holding means.

In testimony whereof we affix our signatures, in presence of two witnesses.

JOHN F. OHMER.
ELMER H. BRIDENBAUGH.

Witnesses:
MATTHEW SIEBLER,
H. B. OHMER.

It is hereby certified that in Letters Patent No. 1,136,164, granted April 20, 1915, upon the application of John F. Ohmer and Elmer H. Bridenbaugh, of Dayton, Ohio, for an improvement in "Taximeters," an error appears in the printed specification requiring correction as follows: Page 23, commencing with line 36, strike out all to and through line 41, which comprises claim 89, and insert the following as claim 89:

*89. In a taximeter, a fare counter, a mileage counter, a time counter, printing mechanism for said counters, an actuator for said fare counter controlling said mileage counter, said time counter and said printing mechanism, said actuator being controlled by said printing mechanism, and a lock controlling said actuator and said printing mechanism.;* and that the said Letters Patent should be read with this correction therein that the same may conform to the record of the case in the Patent Office.

Signed and sealed this 19th day of October, A. D., 1920.

[SEAL.]

M. H. COULSTON,
Acting Commissioner of Patents.

Cl. 235—30.